(12) United States Patent
Kanemaki

(10) Patent No.: US 6,353,856 B1
(45) Date of Patent: Mar. 5, 2002

(54) FIREWALL SYSTEM AND METHOD

(75) Inventor: Hideyasu Kanemaki, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/015,826

(22) Filed: Jan. 29, 1998

(30) Foreign Application Priority Data

Jan. 30, 1997 (JP) ............................................. 9-017027

(51) Int. Cl.[7] ............................................... G06F 15/16
(52) U.S. Cl. ......................... 709/229; 709/230; 709/237
(58) Field of Search ............................... 709/216, 217, 709/218, 224, 225, 229, 236, 246; 370/398, 399, 401, 395; 395/187.01

(56) References Cited

U.S. PATENT DOCUMENTS

| | | | | |
|---|---|---|---|---|
| 5,138,659 A | * | 8/1992 | Kelkar et al. | 380/20 |
| 5,379,297 A | * | 1/1995 | Glover et al. | 370/234 |
| 5,452,296 A | * | 9/1995 | Shimizu | 370/399 |
| 5,452,297 A | * | 9/1995 | Hiller et al. | 370/395 |
| 5,483,527 A | * | 1/1996 | Doshi et al. | 370/399 |
| 5,528,592 A | * | 6/1996 | Schibler et al. | 370/397 |
| 5,581,552 A | * | 12/1996 | Civanlar et al. | 370/396 |
| 5,600,644 A | * | 2/1997 | Chang et al. | 370/404 |
| 5,732,078 A | * | 3/1998 | Arango | 370/355 |
| 5,796,829 A | * | 8/1998 | Newby et al. | 380/21 |
| 5,826,242 A | * | 10/1998 | Montulli | 705/27 |
| 5,828,844 A | * | 10/1998 | Civanlar et al. | 709/228 |
| 5,878,043 A | * | 3/1999 | Casey | 370/397 |
| 5,892,924 A | * | 4/1999 | Lyon et al. | 709/245 |
| 5,896,382 A | * | 4/1999 | Davis et al. | 370/401 |
| 5,898,830 A | * | 4/1999 | Wesinger, Jr. et al. | 713/201 |
| 5,903,559 A | * | 5/1999 | Acharya et al. | 370/355 |
| 5,909,430 A | * | 6/1999 | Reaves | 370/254 |
| 5,912,891 A | * | 6/1999 | Kanai | 370/395 |
| 5,950,195 A | * | 9/1999 | Stockwell et al. | 707/4 |
| 6,081,845 A | * | 6/2000 | Kanemaki et al. | 709/238 |
| 6,229,820 B1 | * | 5/2001 | Kanemaki et al. | 370/468 |

FOREIGN PATENT DOCUMENTS

JP   7264207   10/1995

OTHER PUBLICATIONS

Esaki, H., "Call Admission Control Method in ATM networks", IEEE Supercomm/ICC '92, ISBN: 0-7803-0599-X, pp. 1628-1633, Jun. 1992.*

Myers, E.D., "STU-III-multilevel Secure Computer Interface", IEEE CSAC '94, ISBN: 0-8186-6795-8, pp. 170-179, Dec. 1994.*

Stempel, S., "IpAccess: An Internet Service Access System for Firewall Installations", IEEE, ISBN: 0-8186-7027-4, pp. 31-41, Feb. 1995.*

Chuang, Shaw-Cheng, "Securing ATM Networks", 3rd ACM Conf. on Computer and Communications Security, pp. 19-30, Mar. 1996.*

Perkins, C.E. et al., "Mobility Support in IPv6", 2nd ACM Conf. on Mobile Computing and Networking, pp. 27-37, Nov. 1996.*

Pan, H. et al., "SNMP Based VANTAGE Network Management", IEEE GTC '96, ISBN: 0-7803-336-5, pp. 168-172, Nov. 1996.*

* cited by examiner

*Primary Examiner*—Zarni Maung
*Assistant Examiner*—Jason D. Cardone
(74) *Attorney, Agent, or Firm*—Helfgott & Karas, P.C.

(57) ABSTRACT

A terminal (A) sends a call request message to a terminal (b). This message contains a request for a TCP/IP service. A call control section in a switching node passes the message to an agent, which, in turn, examines whether or not an IP address and a TCP port number set in the received call request message have been entered into a firewall table. If they are found, the request for access to the terminal (b) is granted. As a result, an ATM connection is set up between the terminal (A) and the terminal (b) and a TCP/IP connection is set up on the ATM connection. If they are not found, access to the terminal (b) is refused and no ATM connection is set up between the terminal (A) and the terminal (b).

18 Claims, 33 Drawing Sheets

FIG. 9A

| ORIGINATING IP ADDRESS | TERMINATING IP ADDRESS | TERMINAT- ING PORT | SERVICE NAME |
|---|---|---|---|
| ANY | 133.162.96.b | 119 | NNTP |
| ANY | 133.162.96.b | 25 | SMTP |
| ANY | 133.162.96.b | 80 | HTTP |

FIG. 9B

RECEIVED TCP/IP PACKET INFORMATION :

ORIGINATING IP ADDRESS "133.162.96.a" TERMINATING IP ADDRESS "133.162.96.b" TERMINATING PORT "80"

FIG. 9C

RECEIVED TCP/IP PACKET INFORMATION :

ORIGINATING IP ADDRESS "133.162.96.a" TERMINATING IP ADDRESS "133.162.96.b" TERMINATING PORT "23"

| SOURCE | | DESTINATION | | ORIGINAT- ING DTE ADDRESS | TERMINAT- ING DTE ADDRESS | CELL PORT | |
|---|---|---|---|---|---|---|---|
| VPI | VCI | VPI | VCI | | | FOR SOURCE | FOR DESTI- NATION |
| aa | bb | xa | xb | DTE a | DTE b | DTEa | AGENT B |

F I G. 1 2 A

| SOURCE | | DESTINATION | | ORIGINAT- ING DTE ADDRESS | TERMINAT- ING DTE ADDRESS | CELL PORT | |
|---|---|---|---|---|---|---|---|
| VPI | VCI | VPI | VCI | | | FOR SOURCE | FOR DESTI- NATION |
| aa | bb | xa | xb | DTE a | DTE b | DTEa | AGENT B |
| xa | xc | cc | dd | DTE a | DTE b | AGENT B | DTEb |

F I G. 1 2 B

| SOURCE | | DESTINATION | | ORIGINAT- ING DTE ADDRESS | TERMINAT- ING DTE ADDRESS | CELL PORT | |
|---|---|---|---|---|---|---|---|
| VPI | VCI | VPI | VCI | | | FOR SOURCE | FOR DESTI- NATION |
| aa | bb | cc | dd | DTE a | DTE b | DTEa | DTEb |
| | | | | | | | |

F I G. 1 2 C

| SOURCE | | DESTINATION | | ORIGINAT-ING DTE ADDRESS | TERMINAT-ING DTE ADDRESS | CELL PORT | |
|---|---|---|---|---|---|---|---|
| VPI | VCI | VPI | VCI | | | FOR SOURCE | FOR DESTI-NATION |
| aa | bb | xa | xb | DTE a | DTE b | DTEa | AGENT B |

F I G. 1 4 A

| SOURCE | | DESTINATION | | ORIGINAT-ING DTE ADDRESS | TERMINAT-ING DTE ADDRESS | CELL PORT | |
|---|---|---|---|---|---|---|---|
| VPI | VCI | VPI | VCI | | | FOR SOURCE | FOR DESTI-NATION |
| aa | bb | ERASE | ERASE | DTE a | DTE b | DTEa | ERASE |

F I G. 1 4 B

| SOURCE | | DESTINATION | | ORIGINAT-ING DTE ADDRESS | TERMINAT-ING DTE ADDRESS | CELL PORT | |
|---|---|---|---|---|---|---|---|
| VPI | VCI | VPI | VCI | | | FOR SOURCE | FOR DESTI-NATION |
| ERASE | ERASE | ERASE | ERASE | ERASE | ERASE | ERASE | ERASE |

F I G. 1 4 C

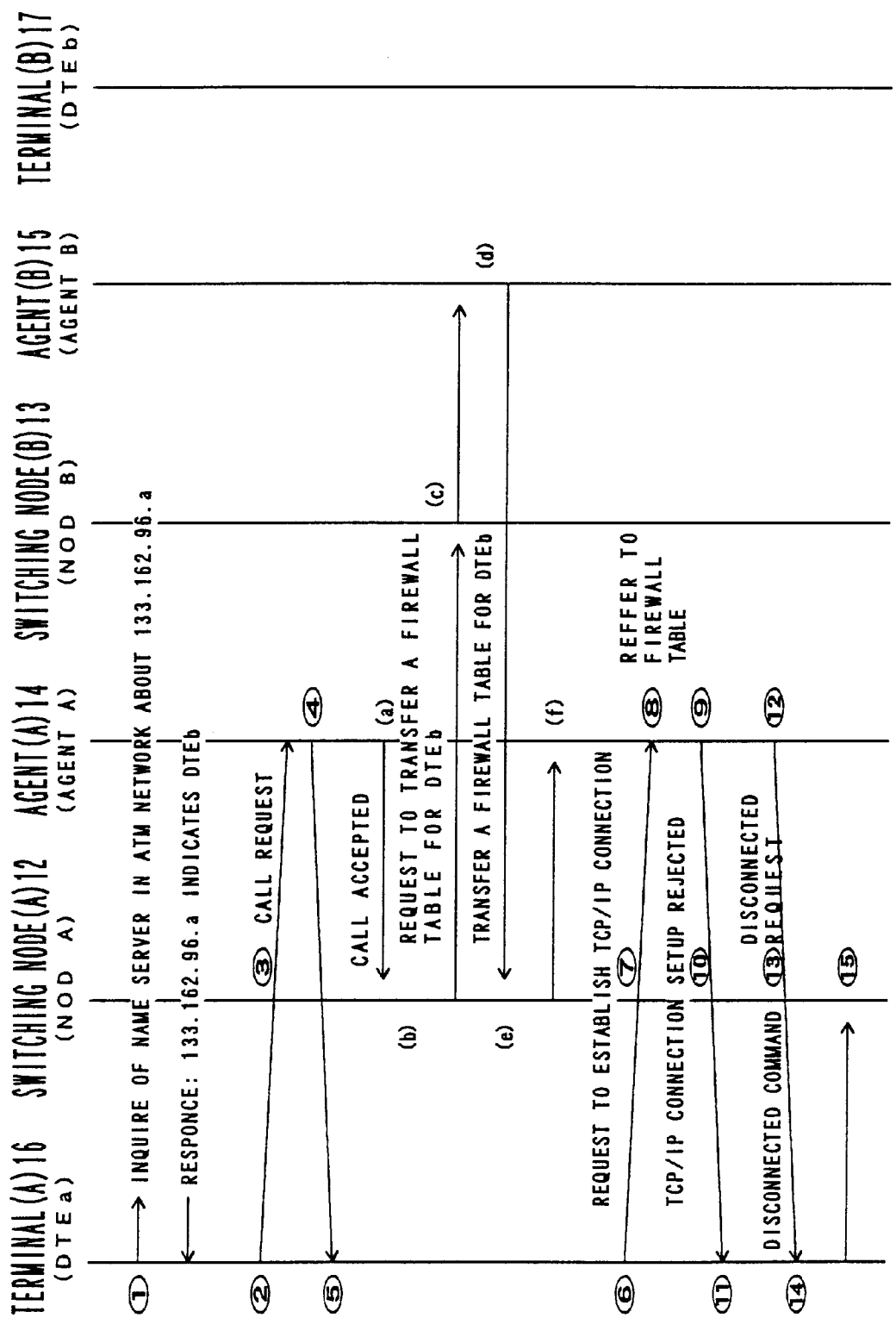
F I G. 16

FIG. 17

| DTE b | NUMBER OF REFERENCES:n | DATE AND TIME OF REFERENCE:yy:mm:dd | | |
|---|---|---|---|---|
| ORIGINATING IP ADDRESS | TERMINATING IP ADDRESS | TERMINATING PORT | SERVICE NAME | |
| ANY | 133.162.96.b | 119 | NNTP | |
| ANY | 133.162.96.b | 25 | SMTP | |
| ANY | 133.162.96.b | 80 | HTTP | |

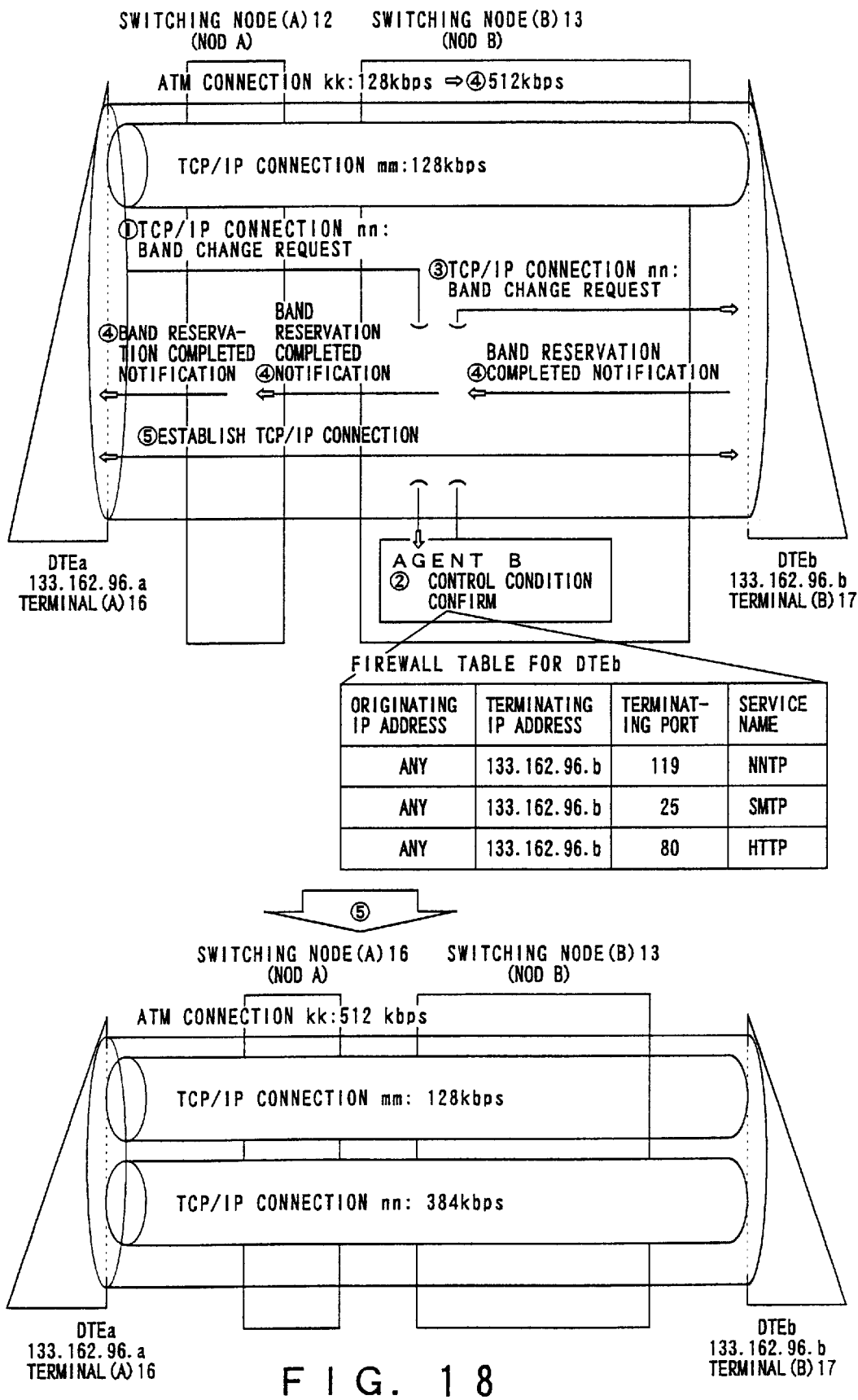
F I G. 18

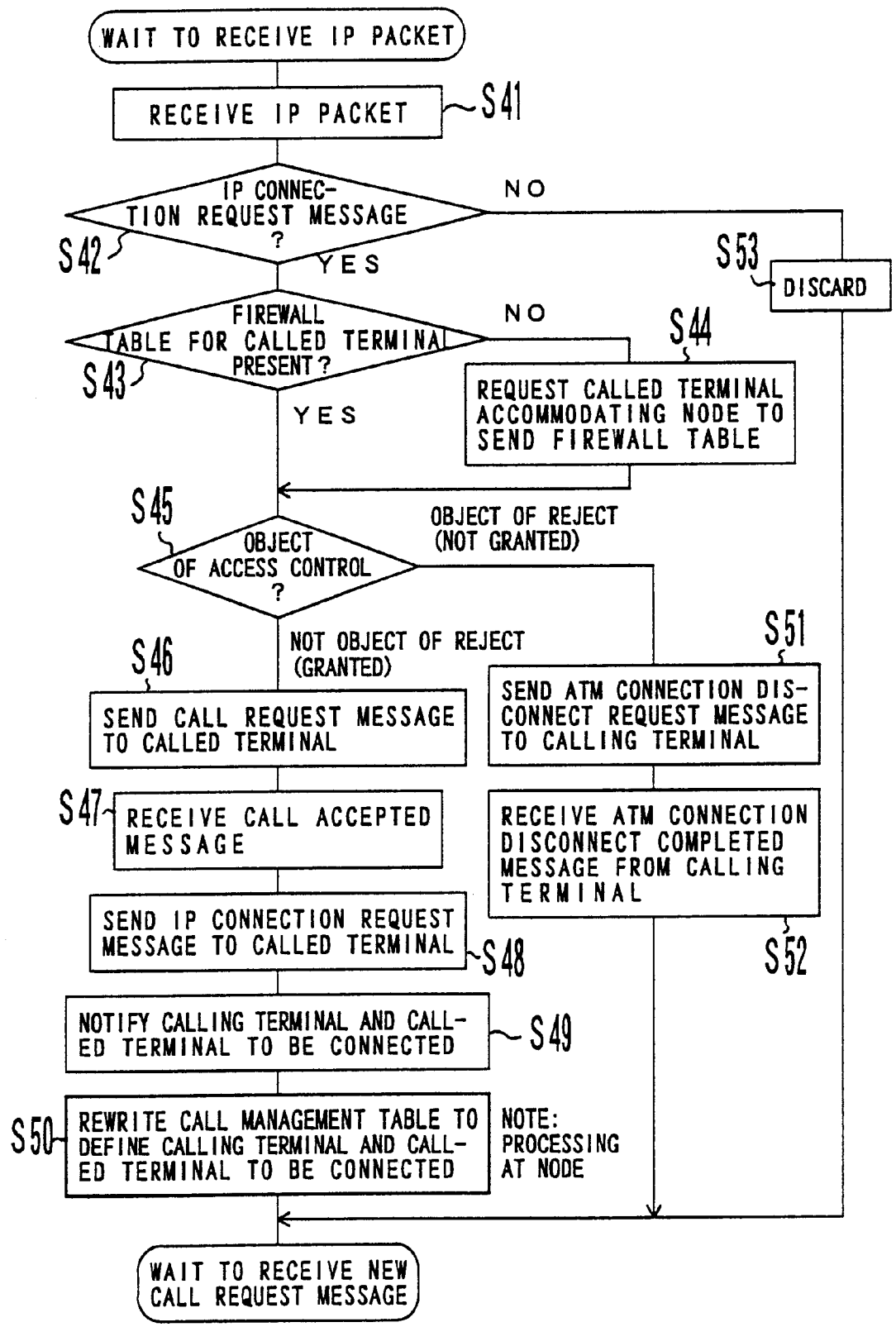
F I G. 2 4

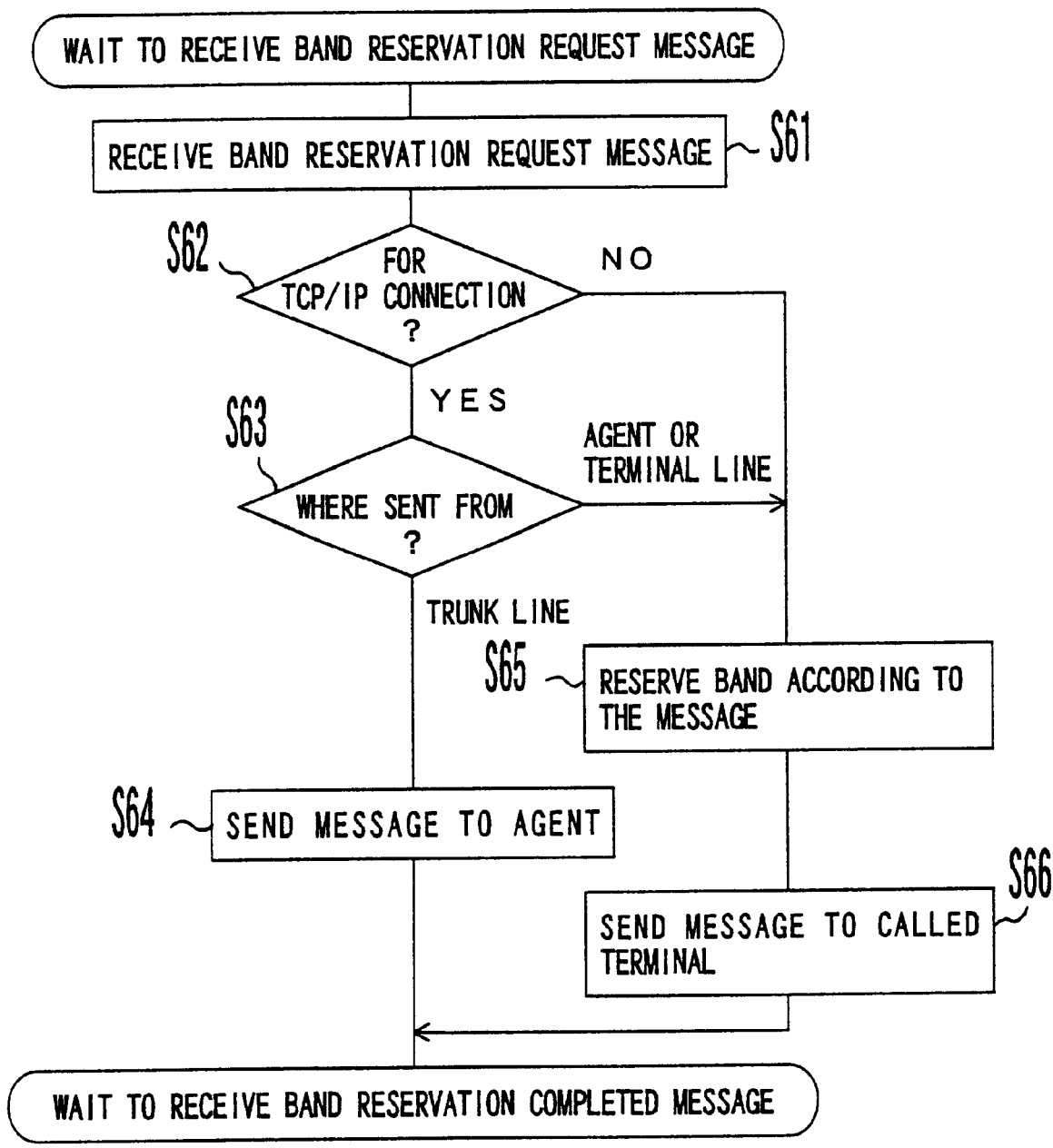
F I G. 25

| ORIGINATING IP ADDRESS | TERMINATING IP ADDRESS | TERMINAT- ING PORT | SERVICE NAME |
|---|---|---|---|
| ANY | 133.162.96b | 119 | NNTP |
| ANY | 133.162.96b | 25 | SMTP |
| ANY | 133.162.96b | 80 | HTTP |
| 133.162.96a | 133.162.96b | 21 | FTP |

FIG. 30A

| ORIGINATIN IP ADDRESS | TERMINATING IP ADDRESS | TERMINAT- ING PORT | SERVICE NAME | PASSWORD |
|---|---|---|---|---|
| ANY | 133.162.96b | 119 | NNTP | XYZA |
| ANY | 133.162.96b | 25 | SMTP | XYZA |
| ANY | 133.162.96b | 80 | HTTP | XYZA |
|  |  |  |  |  |

FIG. 30B

FIREWALL SYSTEM AND METHOD

BACKGROUND OF THE INVENTION

1. Field of the Invention

The present invention relates to a firewall and more specifically to a firewall in communications using IP over ATM protocols.

2. Description of the Related Art

The Internet, which is increasingly being spread, employs TCP (Transmission Control Protocol)/IP (Internet Protocol) as its standard protocol. A system has been discussed which allows communications based on TCP/IP (TCP/IP communications) to be implemented over ATM networks. Such a system is called the IP over ATM. If this technology is established, the Internet can be implemented using the ATM networks.

With the spread of the Internet, opportunities to connect terminals, such as computers, to public networks have been increasing. Under these circumstances, it is important to protect terminals (information that the terminals store) from unauthorized access from the public network side. In this case, a function of blocking a particular type of traffic becomes necessary. The function of blocking a particular type of traffic to thereby increase the security of computers and so on or a device for performing such a function is called a firewall.

FIG. 1 shows an example of installing a firewall in the IP over an ATM system. In this example, terminals (DTE: Date Terminal Equipment) 102 and 107, which can perform TCP/IP communications, are connected to an ATM network 101. A LAN 103, which is an Ethernet network based on TCP/IP, is connected to the ATM network 101 via a router 105, which has a firewall function to allow selective access to the LAN 103 through the ATM network 101.

When, in the above system, the terminal 102 makes access to the terminal 107 to conform to TCP/IP (TCP/IP-based access or TCP/IP access), an ATM connection is first set up between the terminals 102 and 107 and then a TCP/IP connection is set up on that ATM connection.

When the terminal 102 makes TCP/IP access to the terminal 107 within the LAN 103, an ATM connection is first set up between the terminal 102 and the router 105. The terminal 102 then sends an access request to the router 105 over that ATM connection. Upon receipt of the access request, the router 105 decides whether the access request is to be granted or denied in accordance with the IP address and the TCP port number. When the access request is granted, the router 105 sets up a TCP/IP connection between the terminals 102 and 104 utilizing the ATM connection between the terminal 102 and the router 105, so that TCP/IP communications are started. When the access request is denied, on the other hand, the router 105 disconnects the ATM connection to the terminal 102.

Thus, the conventional system prevents unauthorized access to resources within the LAN 103 by the firewall function installed in the router 105, which selectively grants access to the LAN 103 over the ATM network 101.

In the IP over ATM system, in order to make a decision as to whether an access request is to be granted or denied at the TCP/IP level, an ATM connection is once set up without fail regardless of whether the access request is granted or denied at a later time. (An access request which will be granted is referred to as a permissible access request, whereas an access request which will be denied is referred to as the non-permissible access request.) In the example of FIG. 1, an ATM connection is set up between the terminal 102 and the router 105.

With the ATM network 101, once an ATM connection is set up for a call, the call will be billed (or charged). Thus, even when an access request by the terminal 102 to the terminal 104 is regulated (rejected) by the router 105, the terminal 102 will be charged though it receives no service. This is because an ATM connection is set up between it and the router.

Since an ATM connection is set up even for a non-permissible access, network resources are used in vain. For example, even if a request for access by the terminal 102 to the terminal 104 is a non-permissible access request, an ATM connection is set up between the terminal 102 and the router 105, so that a portion of the band of a line 106 that connects the ATM network 101 to the router 105 is assigned to that ATM connection. As a result, the available band of the line 106 may become reduced. A shortage of the available band of the line 106 results in failure to set up an ATM connection on the line. Thus, even if a permissible access request is made, it becomes impossible to make access to the LAN 103. Thus, there is the possibility that a non-permissible access may disturb permissible accesses.

The above problem arises not only in the IP over ATM system but also in a system in which data in a LAN, such as an Ethernet or token ring network, are transferred over an ATM network (such a system may be called LAN emulation).

SUMMARY OF THE INVENTION

It is an object of the present invention to provide a system which implements a firewall while making effective use of network resources.

A firewall system of the present invention which, for use with a communications system in which, over a connection-oriented network that exchanges fixed-length packets to conform to a first protocol, communication traffic that conforms to a second protocol is transferred, controls communications that conform to the second protocol and comprises: a switching node for exchanging fixed-length packets and extracting from received fixed-length packets a fixed-length packet that contains a request made by a first terminal for access to a second terminal, the access request being based on the second protocol; and an agent unit, installed in the network, for judging whether to grant the request for access to the second terminal or not on the basis of information contained in the fixed-length packet extracted by the switching node.

According to the above arrangement, a determination can be made as to whether to grant access to the second terminal without establishing a connection between the switching node and the second terminal. That is, such a determination can be made without using a line connecting the network and the second terminal.

BRIEF DESCRIPTION OF THE DRAWINGS

FIG. 9A shows an example of a firewall table;

FIGS. 9B and 9C show examples of received TCP/IP packets;

FIGS. 12A, 12B and 12C show examples of call management tables corresponding to the sequence shown in FIG. 10;

FIGS. 14A, 14B and 14C show examples of call management tables corresponding to the sequence shown in FIG. 13;

FIGS. 15 and 16 show sequences when a switching node that accommodates a terminal making a request for access makes a decision as to whether the access is granted or not;

FIG. 17 is a diagram for use in explanation of a configuration for deleting infrequently used information from the firewall table;

FIG. 18 shows a sequence when the addition of a TCP/IP connection is granted;

FIG. 24 is a flowchart illustrating the operation of the agent at the time of setting up an ATM connection to a called terminal;

FIG. 25 is a flowchart illustrating the operation of the call control section in the switching node at the time of receiving a band reservation request message;

FIGS. 30A and 30B show examples of firewall tables;

DESCRIPTION OF THE PREFERRED EMBODIMENTS

Figure 2:
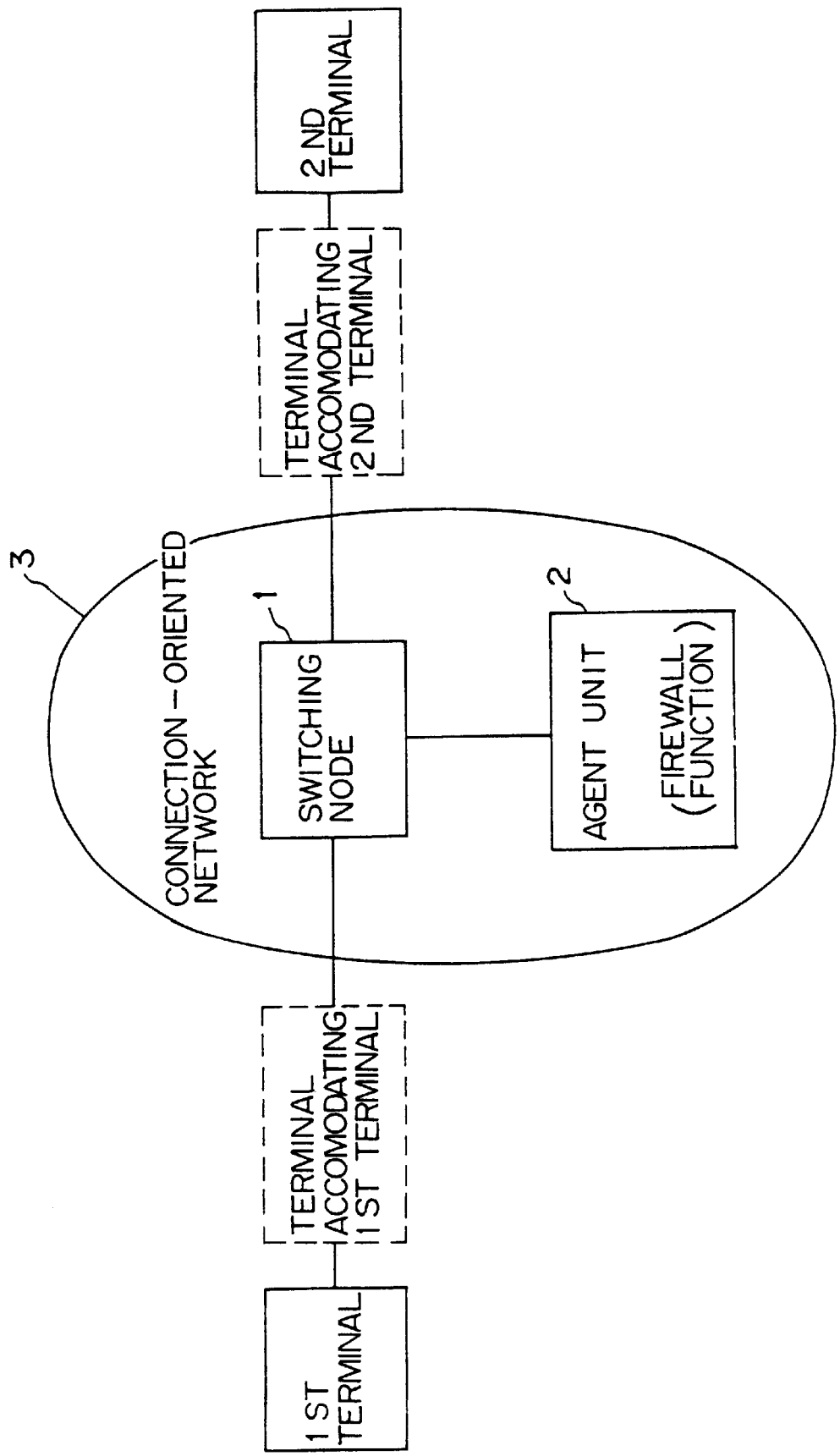
FIG. 2 is a diagram for use in explanation of the principles of a system of the present invention.

FIG. 2 illustrates the principles of the present invention. For use with a system in which, over a connection-oriented network 3 that exchanges fixed-length packets that conform to a first protocol, communications traffic that conforms to a second protocol is transferred, a firewall system of the present invention controls or regulates the second-protocol communications traffic.

A switching node 1, which is a switch in the network 3, exchanges fixed-length packets and extracts from received packets a packet that contains a second-protocol-based request made by a first terminal for access to a second terminal.

A agent unit 2, installed in the network 3, makes a determination of whether access to the second terminal is to be granted or not on the basis of information carried in the fixed-length packet extracted by the switching node 1. Only when the access is granted, the agent unit 2 establishes a first-protocol connection between the first terminal or a terminal that accommodates the first terminal and the second terminal or a terminal that accommodates the second terminal. The terminal that accommodates the first or second terminal is a router by way of example.

According to such a configuration, whether to grant access to the second terminal or not can be determined without establishing a connection between the switching node 2 (or the network 3) and the second terminal (or the terminal that accommodates the second terminal). That is, in order to make this determination, it is not required to use the resources (band) of a line that connects the network 3 to the second terminal.

A firewall system according to another embodiment of the present invention supposes a case where, under the condition that a first protocol-based connection has been set up between the first and second terminals, a request is made for other services through that connection.

In this embodiment, the switching node 1 extracts a fixed-length packet that contains a request to change the band of the connection for second protocol-based access by the first terminal to the second terminal.

The agent unit 2, installed in the network 3, makes a determination of whether to grant access to the second terminal or not on the basis of information carried in the fixed-length packet extracted by the switching node 1. The agent unit 2 changes the band of the connection only when the request is granted.

According to the above configuration, the band of the connection is not changed when the second protocol-based access is not granted, thus preventing network resources (bands) from being wasted.

Hereinafter, the preferred embodiments of the present invention will be described in detail with reference to the accompanying drawings.

Figure 3:
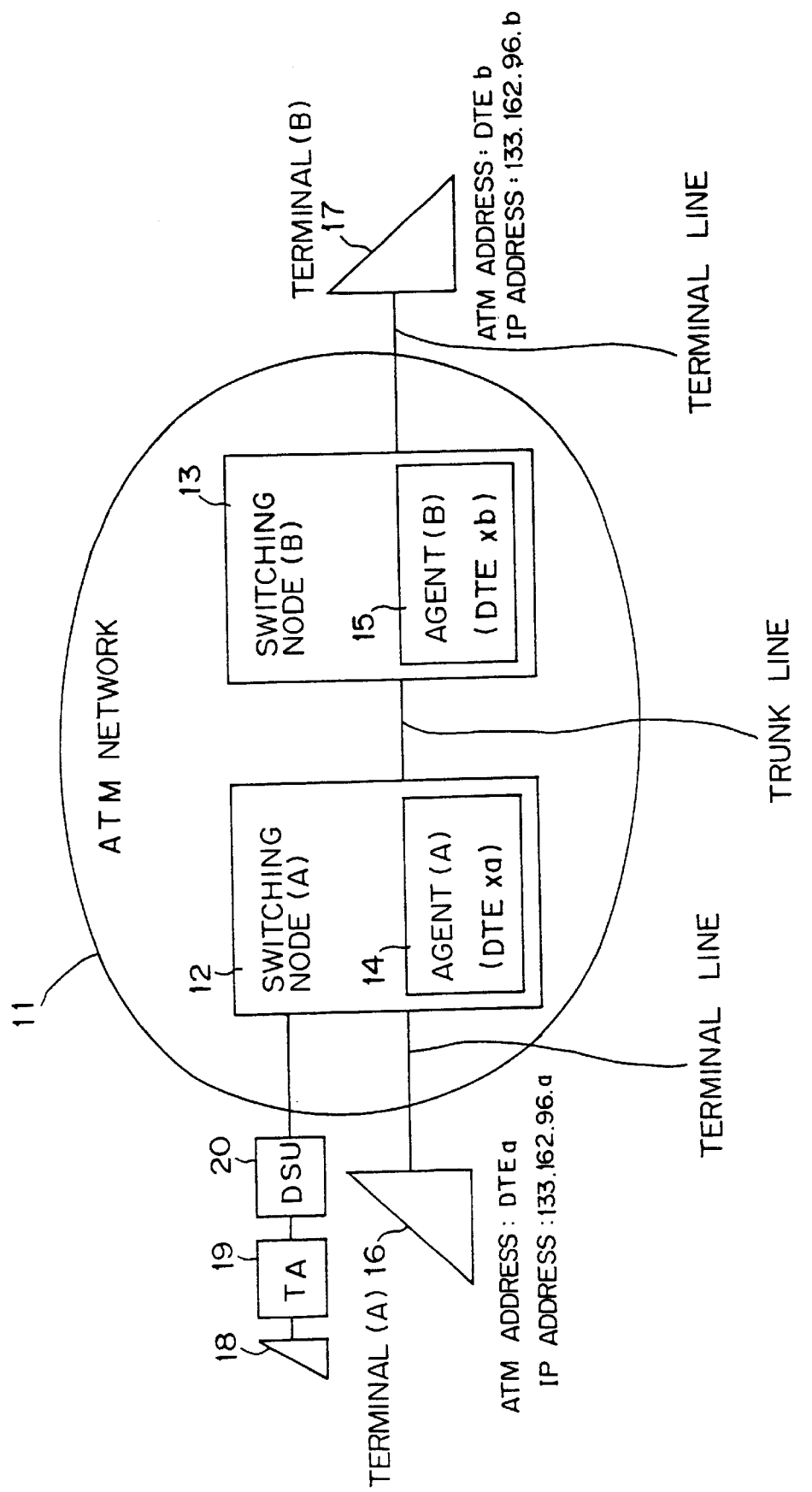
FIG. 3 shows the whole system configuration.

FIG. 3 is a schematic of the whole of a system according to an embodiment. Hereinafter, the embodiment will be described in terms of an IP over ATM system. In the IP over ATM system, each terminal makes IP communications. Here, suppose, as an example, that each terminal makes TCP/IP communications and, in the ATM network, a TCP/IP connection is established on an ATM connection. In the present embodiment, a firewall is installed in the ATM network, which makes a determination of whether to permit a TCP/IP connection to be set up or not. Only for communications for which the establishment of an TCP/IP connection is granted, an ATM connection with the terminating terminal is set up.

An ATM network 11 has a switching node (A) 12 and a switching node (B) 13, each of which is an ATM switch and routes ATM cells in accordance with routing information (VPI/VCI) contained in their respective headers. The switching node (A) 12 and the switching node (B) 13 have an agent (A) 14 and an agent (B) 15, respectively. The agent (A) 14 and the agent (B) 15 are each a virtual terminal and assigned ATM addresses "DTExa" and "DTExb", respectively. Each agent has a firewall function and performs access control based on TCP connections or IP connections. It should be noted that, in the conventional system, the access control is normally performed by a router.

The switching node (A) 12 accommodates a terminal (A) 16, whereas the switching node (B) 13 accommodates a terminal (B) 17. The terminal (A) 16 and the terminal (B) 17 are each TCP/IP terminal and conform to the TCP/IP protocol for communications. Also, the terminal (A) 16 and the terminal (B) 17 are each a DTE (Data Terminal Equipment) by way of example. The terminals are ATM-terminals and have a function of carrying data in ATM cells in sending them over the ATM network and a function of retrieving necessary information from incoming ATM cells from the ATM network. To connect a non-ATM terminal 18 to the ATM network 11, a TA (Terminal Adapter) 19 having a cell assemble/ disassemble function and a DSU (Data Service Unit) 20 are used. The terminal 16 is assigned an ATM address "DTEa" and an IP address "133.162.96.a". The terminal 17 is assigned an ATM address "DTEb" and an IP address "133.162.96.b".

Figure 4:
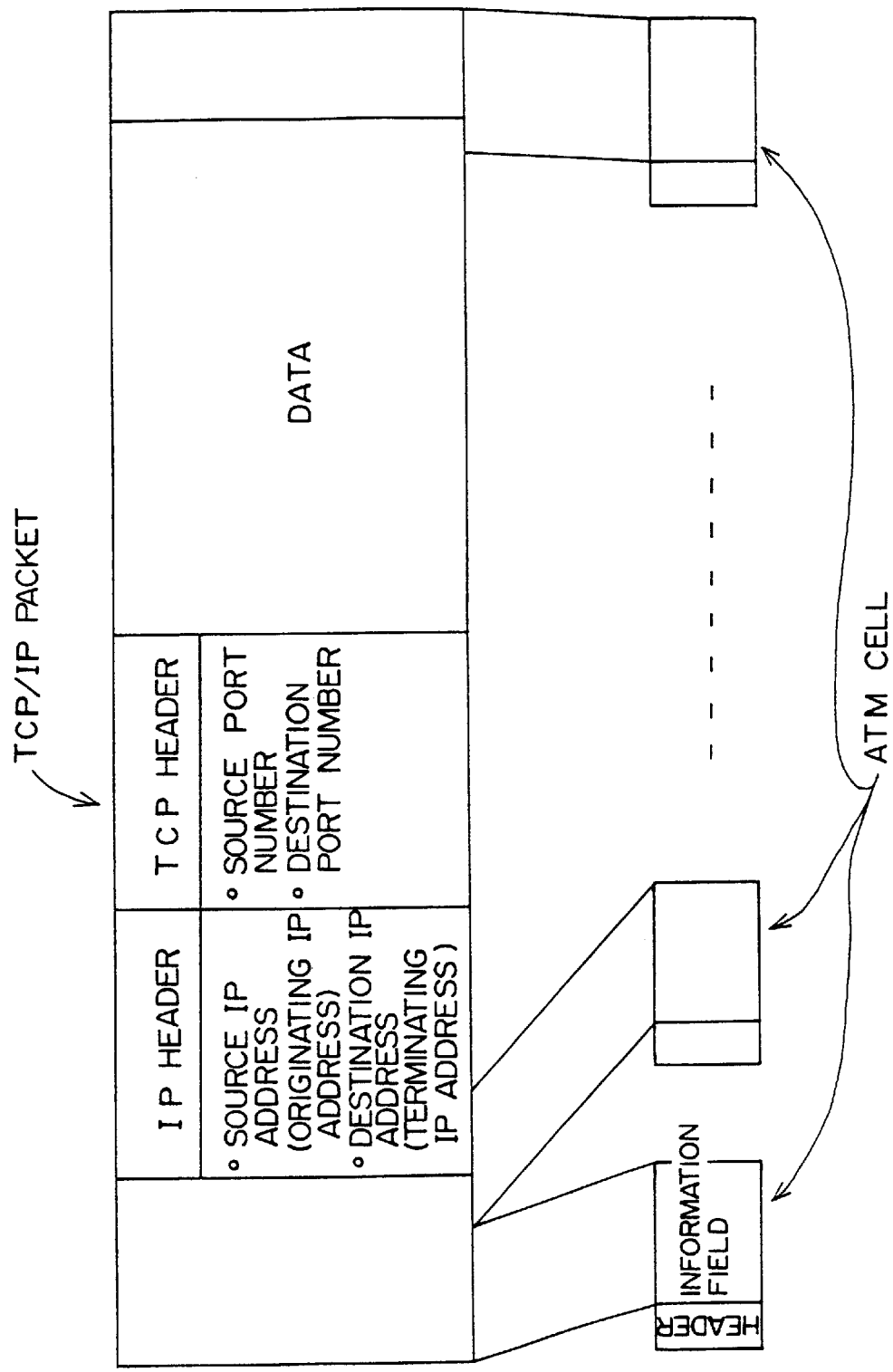
FIG. 4 shows a TCP/IP packet and ATM cells into which the packet is disassembled.

When, in the above system, TCP/IP communications are made between the terminals 16 and 17, a TCP/IP packet is divided into a plurality of pieces of fixed-length data and each piece of fixed-length data is contained in the information field (payload) of a separate ATM cell at the sending end as shown in FIG. 4. The resulting ATM cells are then sent over the ATM network. At the receiving end, the TCP/IP packet is restored from data retrieved from the information fields of incoming ATM cells.

Figure 5A:
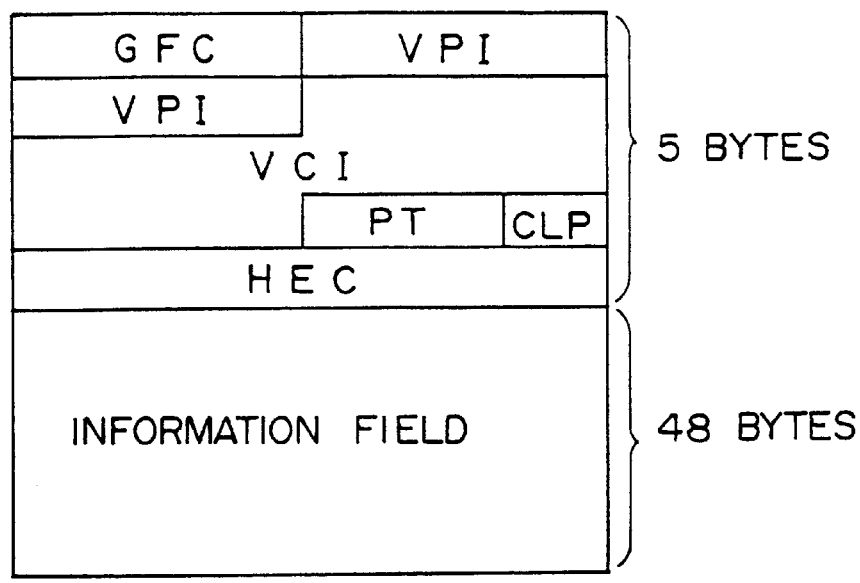
FIG. 5A shows the format of an ATM cell at UNI (user-network interface)
Figure 5B:
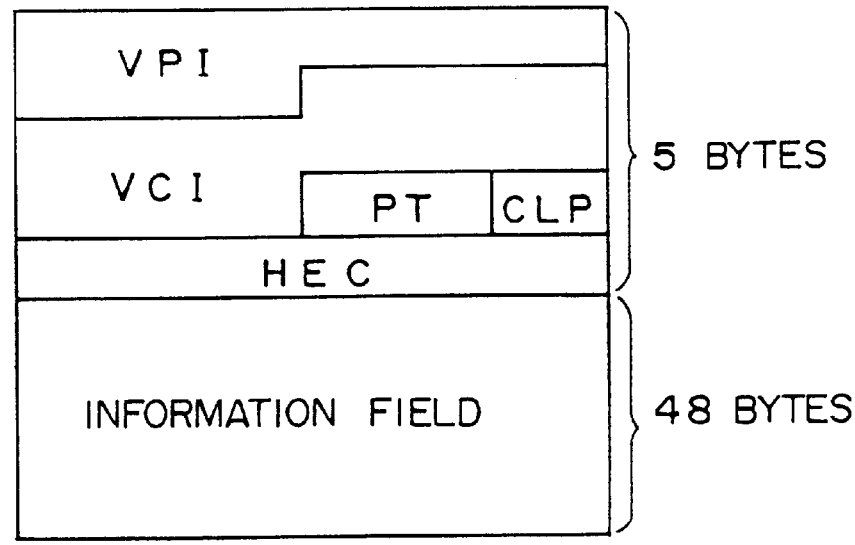
FIG. 5B shows the format of an ATM cell at NNI (node-network interface)

FIGS. 5A and 5B show the formats of ATM cells. More specifically, FIG. 5A shows the format at the UNI (User-Network Interface), while FIG. 5B shows the format at the NNI (Network-Network Interface). An ATM cell is a fixed-length packet of 53 bytes and consists of a 5-bit header and a 48-bit information field.

An ATM cell at the UNI has an 8-bit virtual path identifier (VPI) and a 16-bit virtual channel identifier (VCI) as shown in FIG. 5A. The VPI/VCI is routing information. Generic flow control (GFC) is information used to avoid cell collisions. Payload type (PT) indicates the type of information (user information, control information, etc.) contained in the information field. Cell loss priority (CLP) indicates the cell priority. Header error control (HEC) is used for error detection and correction of the header and for cell synchronization.

An ATM cell at the NNI has a 12-bit VPI and a 16-bit VCI as shown in FIG. 5B. The PT, CLP and HEC are the same as counterparts in the ATM cell at the UNI.

Figure 6:
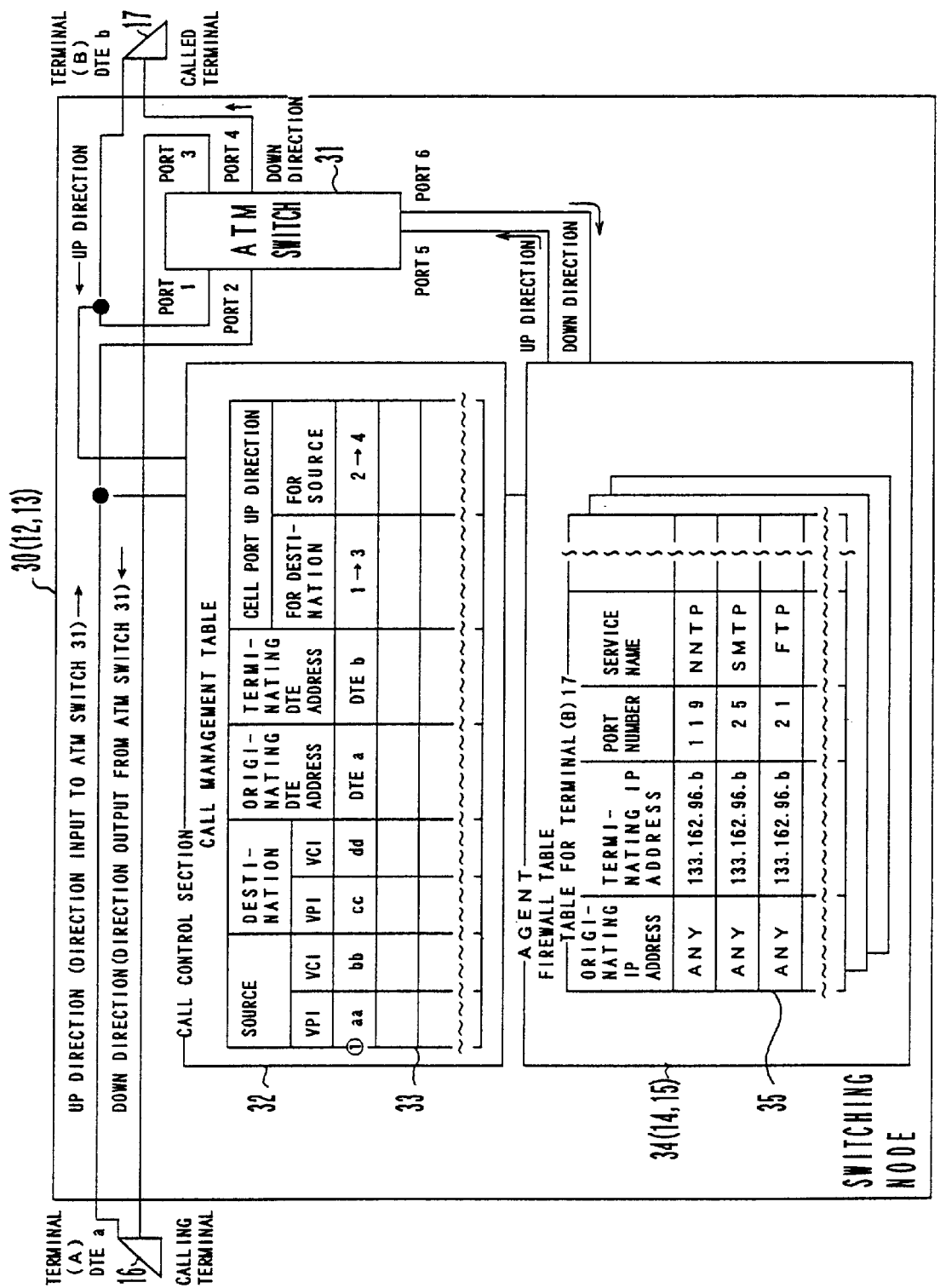
FIG. 6 shows the configuration of a firewall system of the present invention.

FIG. 6 shows an arrangement of the firewall system of the present embodiment. A switching node 30 corresponds to the switching node (A) 12 or the switching node (B) 13 of FIG. 3, and an agent 34 corresponds to the agent (A) 14 or the agent (B) 15.

An ATM switch 31 accommodates more than one input line and more than one output line and exchanges ATM cells autonomously.

A call control section 32 control and manages ATM connections. When a call is set up, the call control section 32 captures and analyzes a call request message and sets up a call management table 33. In addition, the call control section 32 performs call management processing such as disconnecting ATM connections and changing the used bands of ATM connections.

The call management table 33 stores, for each ATM connection, communication routing information such as the address of an originating (calling) terminal, the address of a terminating (called) terminal, the VPI/VCI of data cells (including no idle cells) transferred over the ATM connection, and the numbers of input and output ports of the ATM switch 31 over which the cells are transferred. The switching node 30 exchanges ATM cells in accordance with information stored in the call management table 33.

For example, when receiving from the terminal (A) 16 an ATM cell having "aabb" set as VPI/VCI, the first row of the call management table 33 is referred to, the switching node 30 recognizes that the destination of that ATM cell is the terminal (B) 17, and the ATM switch 31 outputs the ATM cell from its port 4 in accordance with the contents of the call management table 33. As a consequence, the ATM cell is sent to the terminal (B) 17. When receiving an ATM cell having "ccdd" set as VPI/VCI from the terminal (B) 17, on the other hand, the switching node 30 recognizes that the destination of that ATM cell is the terminal (A) 16. The ATM switch 31 outputs the ATM cell from its port 3 in accordance with the contents of the call management table 33. Thus, the ATM cell is sent to the terminal (A) 16.

The agent 34 retrieves data from the information field of the ATM cell and analyzes it. The agent 34 has a function of interpreting IP and TCP headers. The agent 34 is a virtual ATM terminal and, like usual ATM terminals, can issue a connect request (call request) to establish an ATM connection and can receive a connect request to communicate with the requesting terminal over the ATM connection. The agent 34 is accommodated in the ATM switch 31.

The firewall table 35 sets up control conditions for establishing a TCP/IP connection for each of terminals that the switching node 30 accommodates. In the example of FIG. 6, the source IP address (originating IP address), the destination IP address (terminating IP address) and the TCP destination port number are set up. The TCP port number indicates the type of service or application.

The agent 34 assembles a TCP/IP packet from received ATM cells. When the IP address and the port number in this TCP/IP packet have been entered into the firewall table 35, the agent 34 grants permission to establish a TCP/IP connection and then establishes between the agent 34 and the accessed terminal an ATM connection for establishing the TCP/IP connection. In establishing the ATM connection, the agent 34 rewrites the call management table 33.

Figure 1:
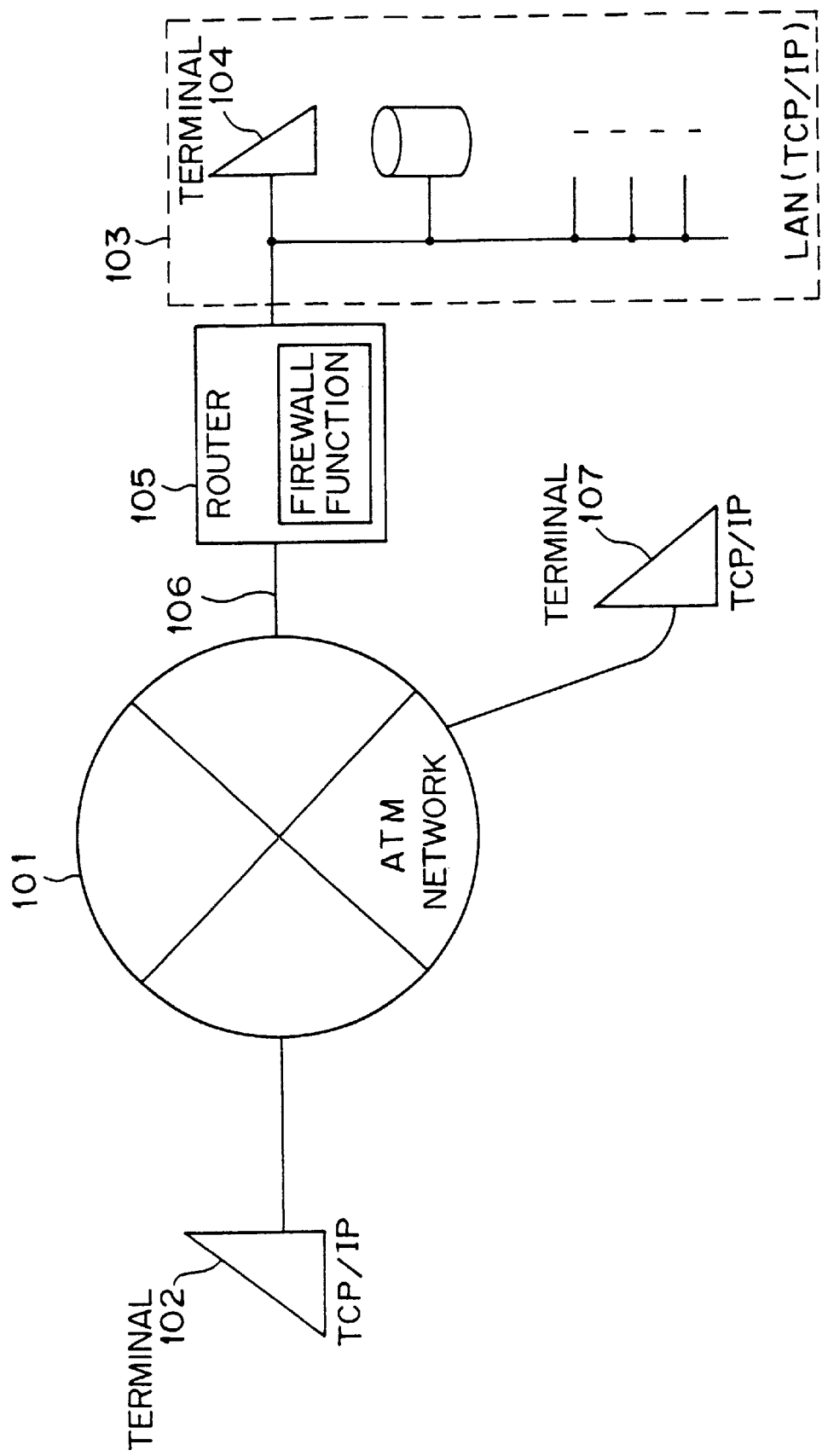
FIG. 1 is a schematic of a conventional IP over ATM system in which a firewall is installed.

Unlike the conventional system shown in FIG. 1 in which the router that accommodates the terminating terminal or the terminating terminal itself makes a determination of whether to grant permission to establish a TCP/IP connection or not, in the inventive system it is the agent 34 installed in the switching node 30 that makes such a determination. That is, the agent 34 is a virtual terminal that works on behalf of the router (or the terminating terminal) in performing the firewall function.

The operation when the terminal (A) 16 makes access to the terminal (B) 17 in accordance with the TCP/IP procedure will be described briefly. First, the terminal (A) 16 issues a request for connection to the terminal (B) 17. This connection request, which contains information indicating the use of TCP/IP as a communication protocol, is then sent in the form of ATM cells.

Upon recognizing that the connection request is made for establishing a TCP/IP connection, the switching node 30 passes the connection request to the agent 34. Thereby, an ATM connection is established between the terminal (A) 16 and the agent 34. The terminal (A) 16, however, recognizes that the ATM connection has been established between it and the terminal (B) 17. When the terminal (A) 16 sends a TCP/IP packet to the terminal (B) 17, it is received by the agent 34 because the ATM connection is established between the terminal (A) 16 and the agent 34.

The agent 34 examines whether the IP address of the terminal (B) 17 and the service type (port number) contained in the received TCP/IP packet are set in the firewall table 35. If not set, then the agent 34 sends a message indicating that permission to establish a TCP/IP connection is not granted to the terminal (A) 16 in behalf of the terminal (B) 17 and disconnects the ATM connection between the terminal (A) 16 and the agent 34, thereby refusing the connection request. If, on the other hand, the IP address and the port number have been set in the firewall table, the agent 34 accepts the connection request to thereby establish an ATM connection between it and the terminal (B) 17 in behalf of the terminal (A) 16. The agent 34 then rewrites the call management table 33 to establish the ATM connection between the terminals 16 and 17. At this point, a TCP/IP connection has already been established between the terminals 16 and 17.

Figure 7:
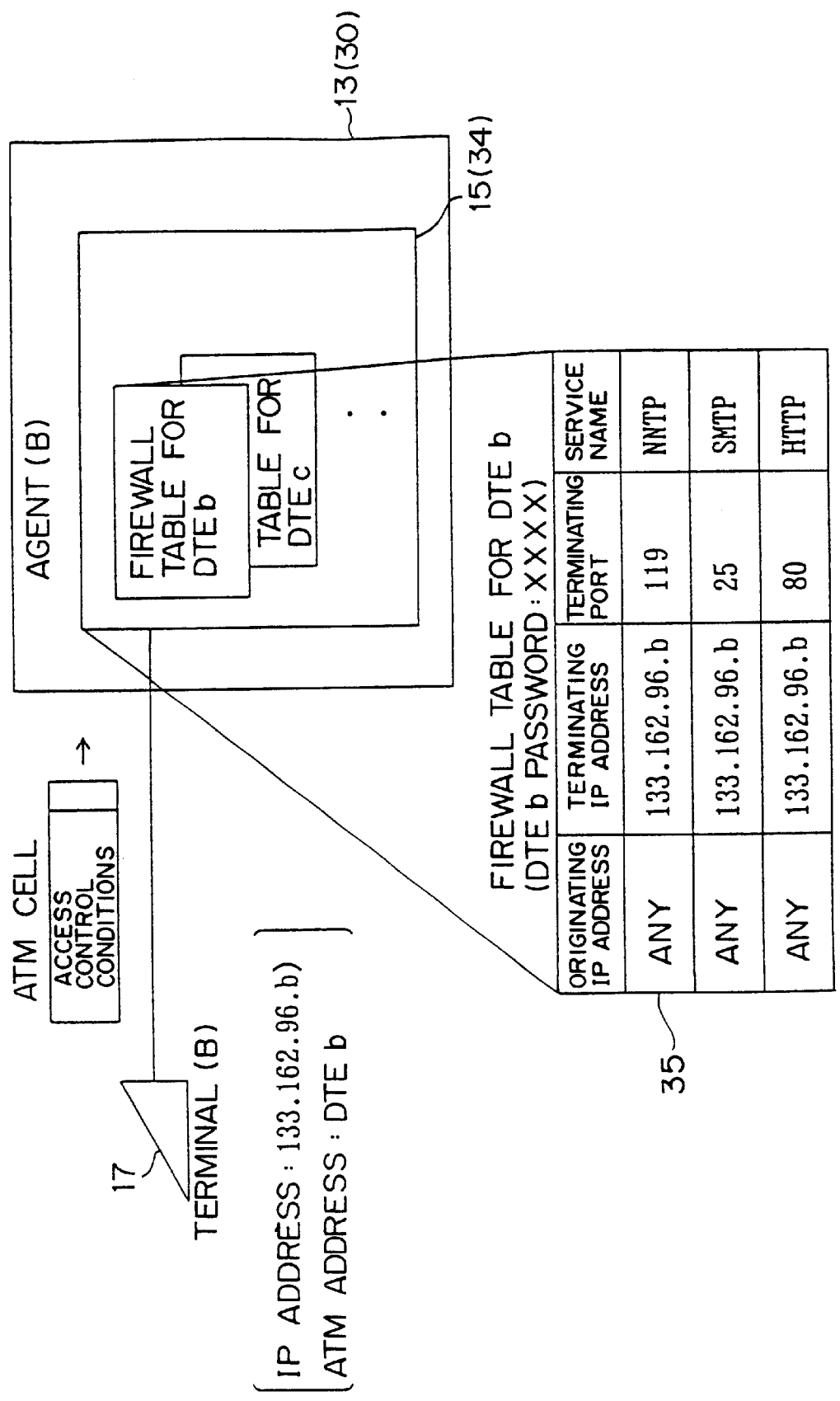
FIG. 7 is a diagram for use in explanation of a method of entering access control conditions into a switching node.
Figure 8:
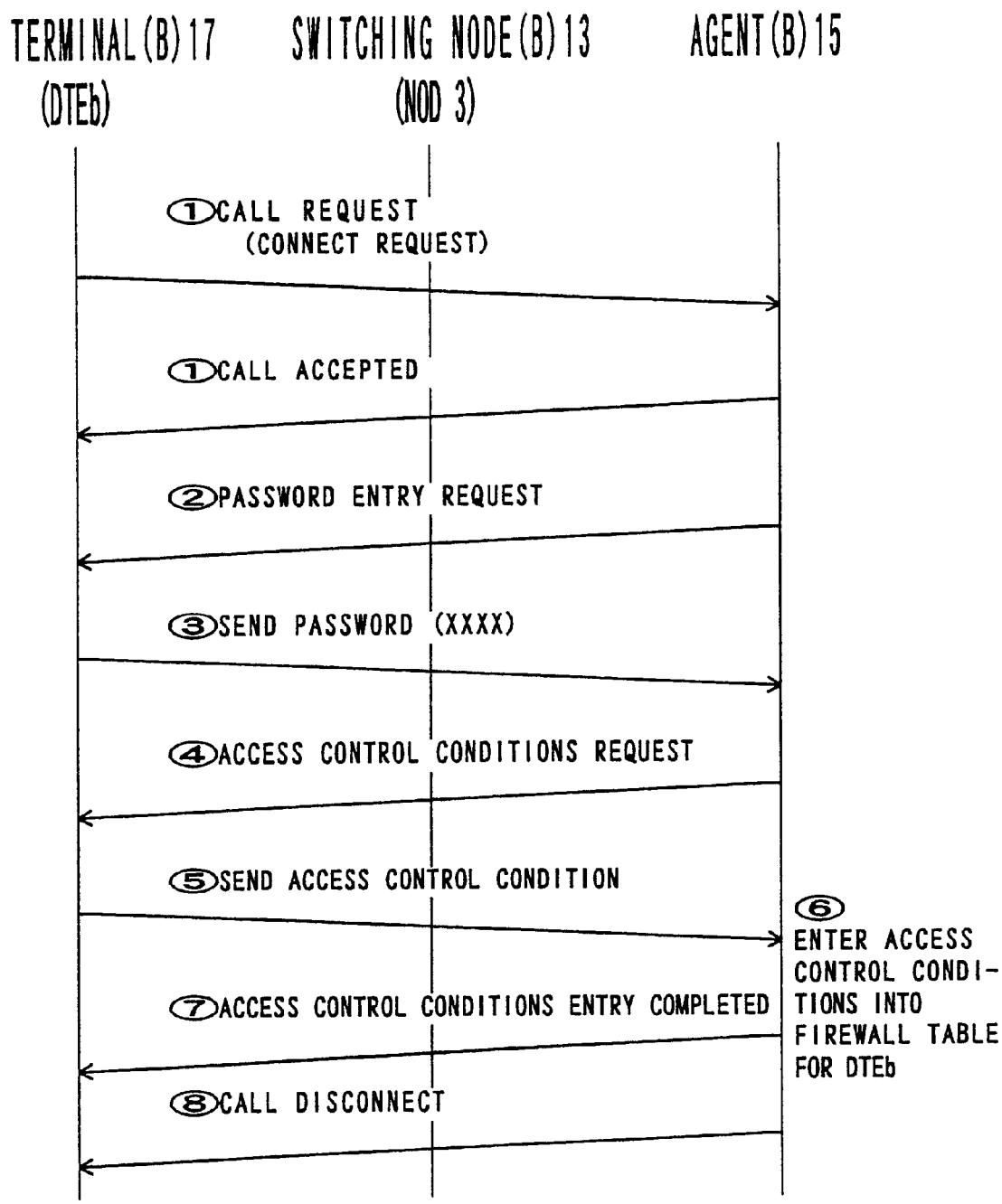
FIG. 8 shows a sequence of entering access control conditions into the switching node.

Next, the procedure of entering access control conditions into the firewall table 35 will be described. Hereinafter, reference is made to FIGS. 7 and 8 to describe an example in which the terminal (B) 17 enters access control conditions into the firewall table in the switching node (B) 13 that accommodates the terminal (B) 17.

Step 1: The terminal (B) 17 makes a call request, whereby an ATM connection is established between the terminal (B) 17 and the agent (B) 15. In this case, the terminal (B) 17 designates the ATM address (DTExb) assigned to the agent (B) 15 as a destination address. The call control section 32 in the switching node 13 sets the ATM address as the destination address in the call management table 33. The agent (B) 15 then starts a setup (entry, change, delete) program for setting up the firewall table and provides an interface therefor.

Steps 2, 3 and 4: The agent (B) 15 makes a request to the terminal (B) 17 to send a password. In response to this, the terminal (B) 17 sends its password (xxxx). Upon receipt of the correct password, the agent (B) 15 sends an access control condition entry accepted message to the terminal (B) 17.

Steps 5 to 8: The terminal (B) 17 sends access control conditions. In this case, data is sent in FTP (File Transfer Protocol) by way of example. Here, as services for which access is granted, the terminal requests NNTP (News Transfer Protocol: port number=119), SMTP (Simple Mail Transfer Protocol: port number=25), and HTTP (HyperText Transfer Protocol: port number=80). The agent (B) 15 enters into the firewall table 35 the IP address of the terminal (B) 17 and the service types (port numbers) as access control conditions as requested by the terminal (B) 17. The access control conditions can include the source address (originating address) as well. The agent (B) 15 sends to the terminal (B) 17 an access control conditions entry completed message indicating that the access control conditions have been entered into the firewall table and then disconnects the ATM connection which has been established between the terminal (B) 17 and it.

In the above example, the access control conditions for the terminal (B) 17 are entered by itself. Another terminal is also allowed to enter the access control conditions for the terminal (B) 17. For example, a LAN administrator may enter access control conditions for each of terminals that the LAN accommodates on a batch basis through a particular terminal. Alternatively, a communication enterprise (common carrier) may directly register access control conditions of terminals under contract at the agent without establishing an ATM connection.

Next, the procedure of determining whether TCP/IP access to a destination terminal is to be granted or not in a switching node will be described. The system may be configured such that a switching node that accommodates the destination terminal or an arbitrary switching node makes such a determination. First, a system configuration such that the switching node that accommodates the destination terminal makes such a determination will be described.

The system configuration will be described below in terms of the case where, in FIG. 3, the terminal (A) 16 issues a TCP/IP access request to the terminal (B) 17 and the switching node (B) 13 that accommodates the terminal (B) 17 makes a determination of whether the access is to be granted or not. Suppose here that the firewall table 35 in the agent (B) 15 have been recorded with access control conditions in accordance with the procedure described in connection with FIGS. 7 and 8 and hence placed in the state shown in FIG. 9A.

The procedure when TCP/IP access is granted will be described with reference to FIG. 10.

Step 1: In accessing the terminal (B) 17, the terminal (A) 16 uses a name server (not shown) on the ATM network 11 to obtain the ATM. address (DTEb) of the terminal (B) 17 from its IP address (133.162.96.b). This procedure conforms to an IP over ATM protocol.

Figure 11:
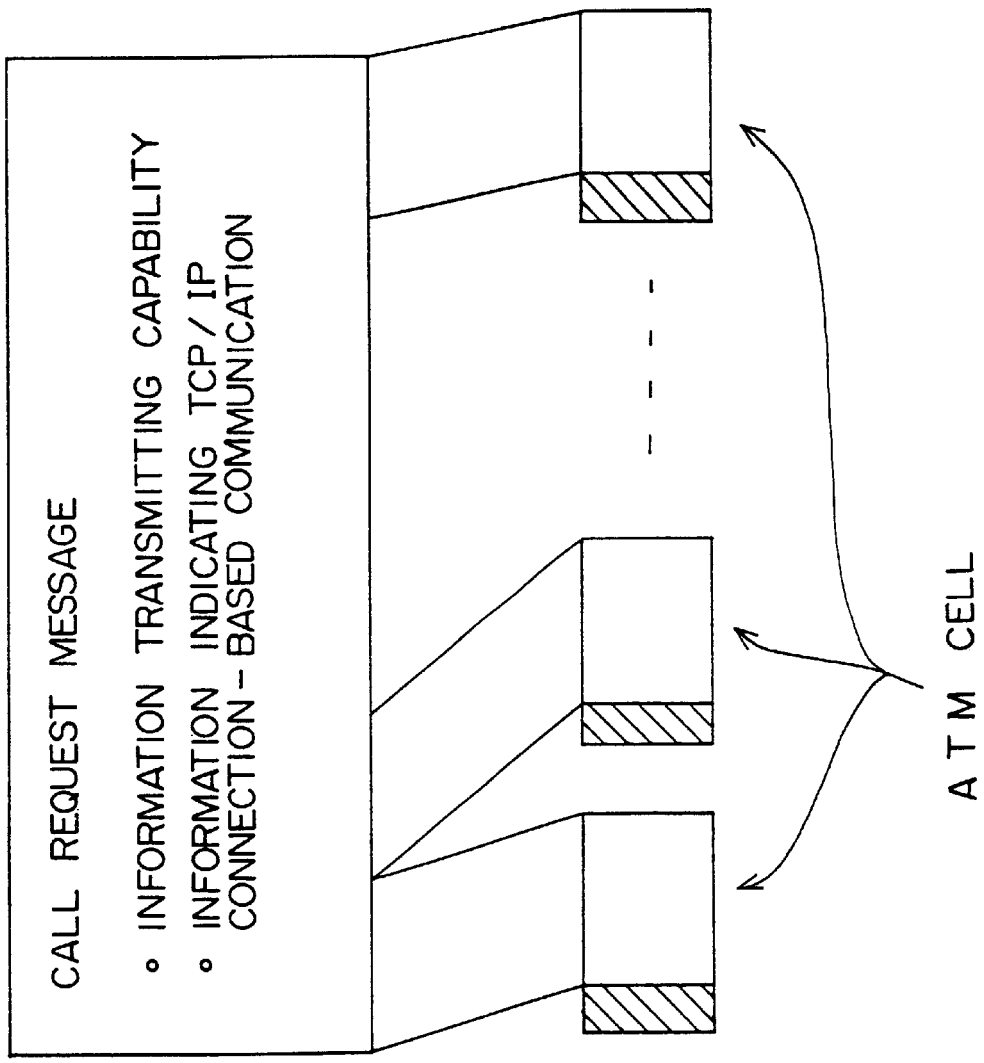
FIG. 11 schematically illustrates the manner in which a call request message is sent in the form of ATM cells.

Step 2: The terminal (A) 16 sends to the terminal (B) 17 a call request message (connect request message) which is carried in ATM cells as shown in FIG. 11. That is, the terminal (A) 16 makes a call with the ATM address DTEb as destination address. The call request message conforms to, for example, ITU Recommendation Q.931 and declares information transmission capability (required band) and so on. The additional information field of the call request message contains information which indicates that TCP/IP connection-based communication is made. The call request is a signaling procedure, and the VPI/VCI allocated to ATM cells carrying the call request message has a value which indicates control cells.

Step 3: Upon receipt of the ATM cells, each switching node refers to the information field because the VPI/VCI value indicates that they are control cells and makes an attempt to establish an ATM connection between the terminal (A) 16 and the terminal (B) 17 in accordance with the call request message. At this point, the switching node (B) 13 that accommodates the accessed terminal (B) 17 refers to the additional information field in the received call request message. When information indicating TCP/IP connection-based communication is contained in that field, the terminal passes the ATM cells carrying the call request message to the agent (B) 15. That is, the call control section 32 in the switching node (B) 13 obtains VPI/VCI (supposed to be xaxb) that is not used at this point and sets this VPI/VCI in the call management table 33 in the switching node (B) 13 as information specifying a route to the agent (B) 15. The state of the call management table 33 at this point is shown in FIG. 12A. This VPI/VCI setting in the call management table 33 causes the switching node (B) 13 to transfer received ATM cells in which VPI/VCI =aabb to the agent (B) 15.

Step 4: The agent (B) 15, having received the call request message for the terminal (B) 17, sends a call accepted message to the terminal (A) 16 in place of the terminal (B) 17. The call accepted message contains "xaxb" as VPI/VCI that is used after an ATM connection has been set up. Thus, an ATM connection is set up between the terminal (A) 16 and the agent (B) 15. The agent (B) 15 stores "aabb" and the terminal (B) 17 with a correspondence established therebetween. That is, the agent (B) 15 stores data that indicates ATM cells that contains "aabb" as VPI/VCI should originally have been transferred to the terminal (B) 17.

Step 5: Upon receipt of the call accepted message, the terminal (A) 16 recognizes that an ATM connection was set up between it and the terminal (B) 17. In fact, the ATM connection has been set up between the agent (B) 15 and the terminal (A) 16. That is, the terminal (A) 16 recognizes that subsequent ATM cells in which VPI/VCI=aabb will be sent to the terminal (B) 17.

Step 6: The terminal (A) 16 sends a TCP/IP packet to the terminal (B) 17. That is, the terminal (A) 16 sends a TCP/IP connection setup request (access request) to the terminal (B) 17. Suppose here that a request is made for a service specified by port number 80. The TCP/IP packet is sent carried in ATM cells set such that VPI/VCI=aabb.

Step 7: Upon receipt of ATM cells with VPI/VCI=aabb, the switching node (B) 13 refers to the call management table 33 in the state as shown in FIG. 12A and sends the ATM cells to the agent (B) 15.

Step 8: The agent (B) 15 reassembles the TCP/IP packet from the received ATM cells. The TCP/IP packet contains information shown in FIG. 9B. Since, in the received ATM cells, VPI/VCI=aabb, the agent (B) 15 knows that the ATM cells are ones to be sent to the terminal (B) 17. Thus, the agent (B) 15 refers to the firewall table 35 set up for the terminal (B) 17 to examine whether the same information as information contained in the TCP/IP packet has been entered in the table. When the access request is granted, the agent (B) 15 holds the TCP/IP packet that is sent to the terminal (B) 17.

Step 9: Upon recognizing that the information contained in the TCP/IP packet has been entered in the firewall table 35, the agent (B) 15 grants the request for access to the terminal (B) 17. At this point, no ATM connection is set up between the switching node (b) 13 and the terminal (b) 17. That is, a determination can be made as to whether access based on a TCP/IP connection on an ATM connection between the terminal (A) 16 and the terminal (b) 17 is to be granted or not before an ATM connection is set up between the switching node (b) 13 and the terminal (b) 17.

Upon judging that access to the terminal (b) 17 is granted, the agent (B) 15 sets up an ATM connection between the terminal (A) 16 and the terminal (b) 17. Since the ATM connection has already been set up between the terminal (A) 16 and the agent (b) 15, the agent (b) 15 simply sets up an ATM connection to the terminal (b) 17. Thus, the agent (b) 15 sends the call request message (connect request message) to the terminal (b) 17 in place of the terminal (A) 16. In this case, the source address (originating address) is the ATM address DTEa of the terminal (A) 16. As VPI/VCI that is used after the ATM connection has been set up, a value (VPI/VCI=xaxc) that is not in use at that point is obtained and entered into the call management table 33.

Step 10: Upon receipt of the call request message from the agent (B) 15, the switching node (B) 13 obtains VPI/VCI (=ccdd) that is not currently used and enters it into the call management table 33 as an identifier to specify a route to the terminal (B) 17. As a result, the call management table 33 is placed in the state shown in FIG. 12B. The switching node (B) 13 allocates VPI/VCI=ccdd to ATM cells carrying the call request message for transmission.

Steps 11, 12 and 13: Upon receipt of the call request message from the switching node (B) 13, the terminal (B) 17 recognizes that the message is a call request by the terminal (A) 16 and then sends a call accepted message to the terminal (A) 16. The call accepted message is sent carried in ATM cells assigned VCI/VCI=ccdd. Upon receipt of the call accepted message, the switching node (B) 13 refers to the call management table 33 in the state shown in FIG. 12B and passes the message to the agent (B) 15 without transferring it to the terminal (A) 16. Thus, an ATM connection is set up between the agent (B) 15 and the terminal (b) 17. After that, the agent (B) 15 carries the TCP/IP packet which has been held in step 8 in ATM cells and assigns VPI/VCI=xaxc to the ATM cells for transmission.

Steps 14 to 16: Upon receipt of ATM cells sent in step 13, the switching node (B) 13 refers to the call management table 33 placed in the state shown in FIG. 12B and transfers the cells to the terminal (B) 17. The agent (B) 15 then rewrites the call management table 33 in the switching node (B) 13 in such a way as to connect together the terminal (A) 16 and the terminal (B) 17 with no intervention of the agent (B) 15. As a result, the call management table 33 shifts to the state shown in FIG. 12C.

At the time when the ATM connection is set up between the terminal (A) 16 and the terminal (B) 17 in accordance with steps 1 through 16, the TCP/IP access request has already been granted by the agent (B) 15. Subsequently, the terminal (A) 16 and the terminal (B) 17 are allowed to communicate with each other over the TCP/IP connection.

Figure 13:
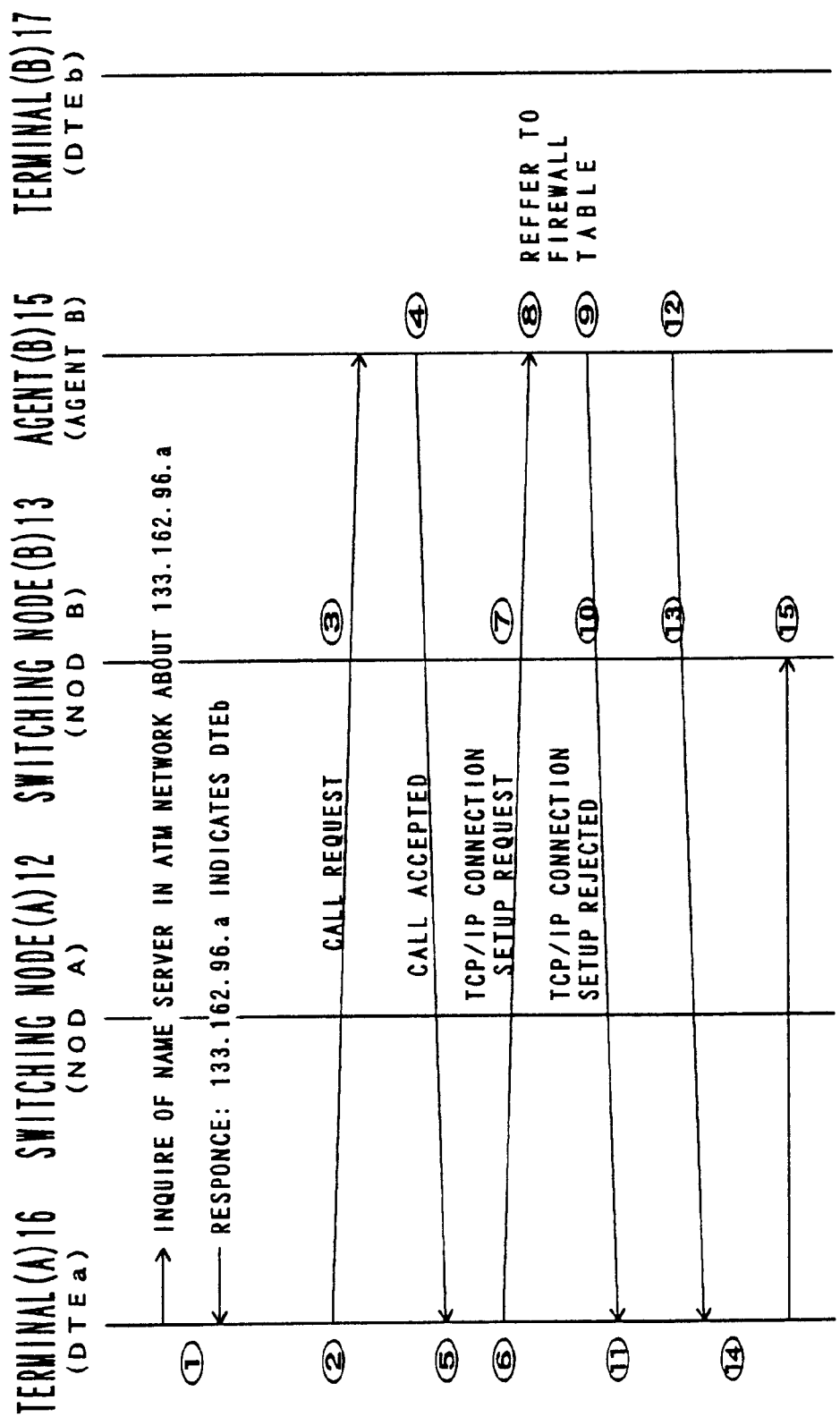
FIG. 13 shows a sequence when access is not granted.

The procedure when TCP/IP access is not granted will be described with reference to FIG. 13. In the following description, it is assumed that the firewall table 35 associated with the terminal (B) 17 is placed in the state shown in FIG. 9A, and the terminal (A) 16 makes a request to the terminal (B) 17 for Telenet service (port number=23).

Steps 1 through 5: These are the same as steps 1 through 5 described in connection with FIG. 10.

Steps 6 and 7: The terminal (A) 16 sends a TCP/IP packet to the terminal (B) 17. That is, the terminal (A) 16 sends a TCP/IP connection setup request (access request) to the terminal (B) 17. Suppose that the request is made for service specified by port number 23. The TCP/IP packet is sent carried in ATM cells set such that VPI/VCI=aabb. Upon receipt of ATM cells with VPI/VCI=aabb, the switching node (B) 13 refers to the call management table 33 in the state shown in FIG. 14A and sends the ATM cells to the agent (B) 15.

Steps 8 and 9: The agent (B) 15 restores the TCP/IP packet from the received ATM cells. The packet contains information shown in FIG. 9C. The agent (B) 15 refers to the firewall table 35 in the state of FIG. 9A to examine whether the same information as that contained in the TCP/IP packet has been entered. Upon recognizing that the information contained in the TCP/IP packet is not entered into the firewall table 35, the agent (B) 15 determines that the request for access to the terminal (b) 17 should be refused. At this point, no ATM connection is set up between the switching node (b) 13 and the terminal (b) 17. That is, a determination can be made as to whether access based on a TCP/IP connection on an ATM connection between the terminal (A) 16 and the terminal (b) 17 is to be granted or not before an ATM connection is set up between the switching node (b) 13 and the terminal (b) 17.

Upon recognizing that access to the terminal (b) 17 is not granted, the agent (B) 15 sends to the terminal (A) 16 a TCP/IP connection setup rejected message describing that the setup of an TCP/IP connection is not granted. This message is carried in ATM cells with VPI/VCI set to xaxb.

Step 10: Upon receipt of the ATM cells carrying that message, the switching node (B) 13 refers to the call management table 33 in the state of FIG. 14A to transfer the cells to the terminal (A) 16.

Step 11: The terminal (A) 16 receives the message describing that the setup of an TCP/IP connection is not granted. The terminal (A) 16 considers that message to have been sent from the terminal (B) 17. The message is passed to a TCP/IP application program in the terminal (A) 16, so that the application program stops sending TCP/IP packets. The TCP/IP program may make a request for disconnecting the ATM connection set up for a TCP/IP connection.

Steps 12 and 13: The agent (B) 15 sends to the call control section 32 in the switching node (B) 13 a request for disconnecting the ATM connection with the terminal (A) 16. Thereby, the call management table 33 in the switching node (B) 13 is rewritten to the state shown in FIG. 14B. The switching node (B) 13 sends to the terminal (A) 16 a message requiring that the ATM connection should be disconnected.

Steps 14 and 15: Upon receipt of that message, the terminal (A) 16 sends to the switching node (B) 13 an ATM connection disconnect completed message describing that the disconnection of the ATM connection has been completed. As a result, the call management table 33 in the switching node (B) 13 is rewritten to the state shown in FIG. 14C.

In connection with FIGS. 9 through 14, description was given of the configuration in which the switching node that accommodates the destination terminal (accessed terminal) makes a determination of whether to grant TCP/IP connection-based access or not. Hereinafter, the configuration in which the switching node that accommodates the sending terminal (accessing terminal) makes such a determination.

In the following description, it is supposed that, when the terminal (A) 16 issues a request for TCP/IP access to the terminal (B) 17, the switching node (A) 12 that accommodates the terminal (A) 16 determines whether to grant the access or not. Suppose that the access control conditions associated with the terminal (B) 17 are stored in the firewall table in the switching node (B) 13, but not in the firewall table in the switching node (A) 12. The procedure of entering the access control conditions into a firewall table conforms to that described in connection with FIGS. 7 and 8.

The procedure when TCP/IP access is granted will be described with reference to FIG. 15.

The sequence shown in FIG. 15 remains basically unchanged from the sequence shown in FIG. 10 except for steps a through f which will be described later. However, it should be noted that, in the sequence of FIG. 15, the processes performed by the switching node (B) 13 and the agent (B) 15 in the sequence of FIG. 10 are performed by the switching node (A) 12 and the agent (A) 14.

Figure 15:
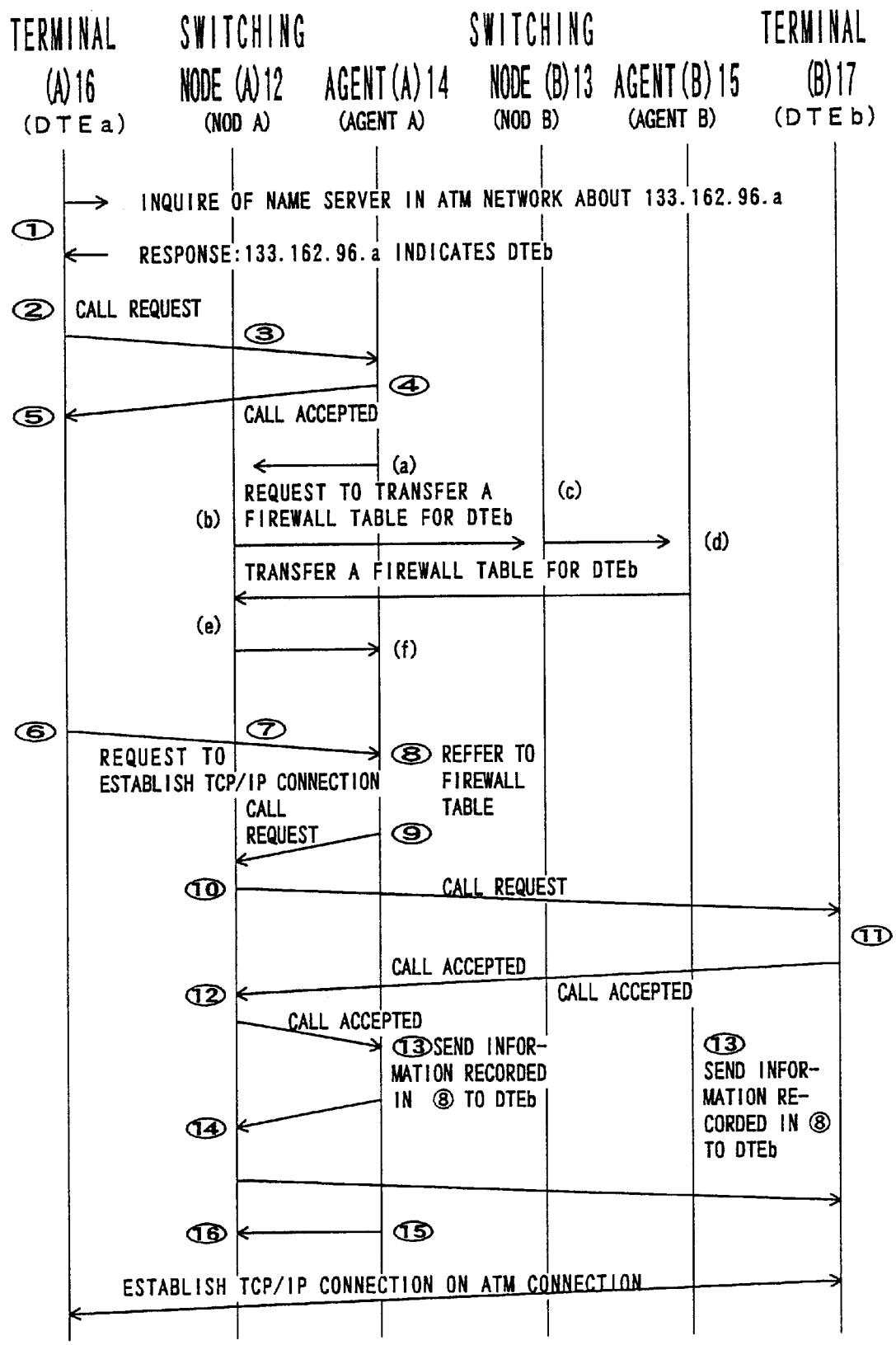

That is, in the sequence of FIG. 15, when the terminal (A) 16 issues a request for TCP/IP access to the terminal (B) 17, an ATM connection is set up between the terminal (A) 16 and the agent (A) 14 and the call request message is sent to the agent (A) 14. The agent (A) 14 then makes a determination of whether to grant the TCP/IP access or not and, only when it is granted, sets up an ATM connection between the terminal (A) 16 and the terminal (B) 17. Steps a through f will be described below.

Step a: Upon receipt of a call request (connect request) to the terminal (B) 17, the agent (A) 14 searches its firewall table 35 for access control conditions associated with the terminal (B) 17. When the access control conditions are not found in the table, the agent (A) 14 sends a message requesting the access control conditions associated with the terminal (B) 17.

Step b: Upon receipt of that message, the switching node (A) 12 knows the switching node (switching node (B) 13) that accommodates the terminal (B) 17 from its ATM address and then sends to that switching node (B) 13 a message requesting the access control conditions for the terminal (B) 17. The method of identifying a switching node that accommodates the destination terminal on the basis of a destination ATM address remains unchanged from the usual call procedure.

Steps c and d: Upon receipt of that message, the switching node (B) 13 passes it to the agent (B) 15. In response to the message, the agent (B) 15 sends the access control conditions for the terminal (B) 17 to the switching node (A) 12.

Steps e and f: The switching node (A) 12 passes the access control conditions for the terminal (B) 17 sent from the agent (B) 15 to the agent (A) 14, and the agent (A) 14 then enters the access control conditions into its firewall table.

In this manner, steps a through f permit access control conditions associated with an access request receiving terminal (terminal (B) 17) to be entered into a switching node (switching node (A) 12) that accommodates an access request sending terminal (terminal (A) 16). Thus, once access control conditions associated with an access request receiving terminal are entered into a switching node that accommodates an access request sending terminal, that switching node will become able to determine whether to grant access or not.

FIG. 16 shows the procedure when no TCP/IP access is granted. Steps a through f are the same as those in the sequence described in connection with FIG. 15. The other steps are also the same as those in the sequence described in connection with FIG. 13. Thus, the description of the sequence of FIG. 16 is omitted.

After a determination was made as to whether to grant access or not in the switching node that accommodates an access request sending terminal, the same determination need not be made in another switching node.

In connection with FIGS. 15 and 16, the configuration was described in which access control conditions associated with an access request receiving terminal are stored into the switching node that accommodates an access request sending terminal. In this case, however, considering that there are many terminals to be accessed, access control conditions must be written into the firewall table 35 each time access is made to a terminal. In practice, there is a limit to the size of the firewall table 35. Therefore, it is required to delete from the firewall table infrequently used access control conditions sent from other switching nodes.

Which access control conditions are to be deleted from the firewall table is determined according to the frequency at which they are referenced and the date and time of past references. That is, the firewall table 35 has an area in which the frequency of reference and the date and time of reference are recorded for each access request receiving terminal, the data being updated each time a reference is made. If, when the firewall table 35 is full, access control conditions are further sent from another switching node, access control conditions that satisfy the following conditions are deleted:

Condition 1: The number of references is 10 or less.

Condition 2: The date of the last reference is one month or more before.

This arrangement will delete access control conditions which are not frequently used and provide higher utilization of the firewall table.

Next, another embodiment of the present invention will be described. This embodiment assumes the case where, when a TCP/IP connection has been established on a certain ATM connection, another TCP/IP connection is further established on that ATM connection.

In the following description, it is supposed that an ATM connection kk assigned a band of 128 kbps has been established between the terminal (A) 16 and the terminal (B) 17, and a TCP/IP connection mm has been established on the ATM connection kk. The TCP/IP connection mm provides a simple mail transfer protocol (port number=25). In such a situation, when the terminal (A) 16 requests another TCP/IP service of the terminal (B) 17, a TCP/IP connection nn is further established on the ATM connection kk. In this case, it is required to increase the band of the ATM connection kk.

The procedure when the addition of a TCP/IP connection is granted will be described with reference to FIG. 18. Suppose here that the terminal (A) 16 requests the HTTP (port number=80) service of the terminal (B) 17. In this case, suppose that the TCP/IP connection nn to be added needs 384 kbps as its band, and hence it is required to increase the band of the ATM connection kk from 128 to 512 kbps.

Step 1: To establish the TCP/IP connection nn to the terminal (B) 17, the terminal (A) 16 sends a band reservation request message to the terminal (B) 17. This message contains the originating IP address "133.162.96.a", the terminating IP address "133.162.96.b", and the port number "80". The message is sent over the ATM network in the form of ATM cells with the VPI/VCI value indicating control cells.

Upon receipt of the ATM cells, the switching node (B) 13 refers to the information field of the ATM cells because the VPI/VCI value indicates control cells. Here, the information field contains the band reservation request message and contains information on TCP/IP. The call control section 32 in the switching node (B) 13 passes the message to the agent (B) 15 not to the terminal (B) 17.

Steps 2 and 3: The agent (B) 15 refers to the firewall table 35 set up for communication between the terminal (A) 16 and the terminal (B) 17 to know that the IP address and the TCP port number contained in the band reservation request message are accessible. The agent (B) 15 then sends the band reservation request message to the terminal (B) 17.

Steps 4 and 5: On determination that the band specified by the band reservation request message can be reserved, the terminal (B) 17 sends to the terminal (A) 16 a notification that the band can be reserved. Thus, the band is reserved between the terminal (B) 17 and the switching node (B) 13, between the switching node (B) 13 and the switching node (A) 12, and between the switching node (A) 12 and the terminal (A) 16, and the ATM connection kk is assigned a band of 512 kbps. Between the terminal (A) 16 and the terminal (B) 17 is established a new TCP/IP connection over which the HTTP service is presented.

The procedure when the addition of a TCP/IP connection is not granted will be described with reference to FIG. 19. Suppose here that the terminal (A) 16 makes a request to the terminal (B) 17 for TELNET (port number=23) service.

Step 1: This is the same as step 1 in the sequence of FIG. 18.

Steps 2 and 3: The agent (B) 15 refers to the firewall table 35 set up for communication between the terminal (A) 16 and the terminal (B) 17 and knows that access to the IP address and the TCP port number contained in the band reservation request message is not granted. In this case, the agent (B) 15 sends to the terminal (A) 16 a band change denied message describing that the band change is not granted.

Figure 19:
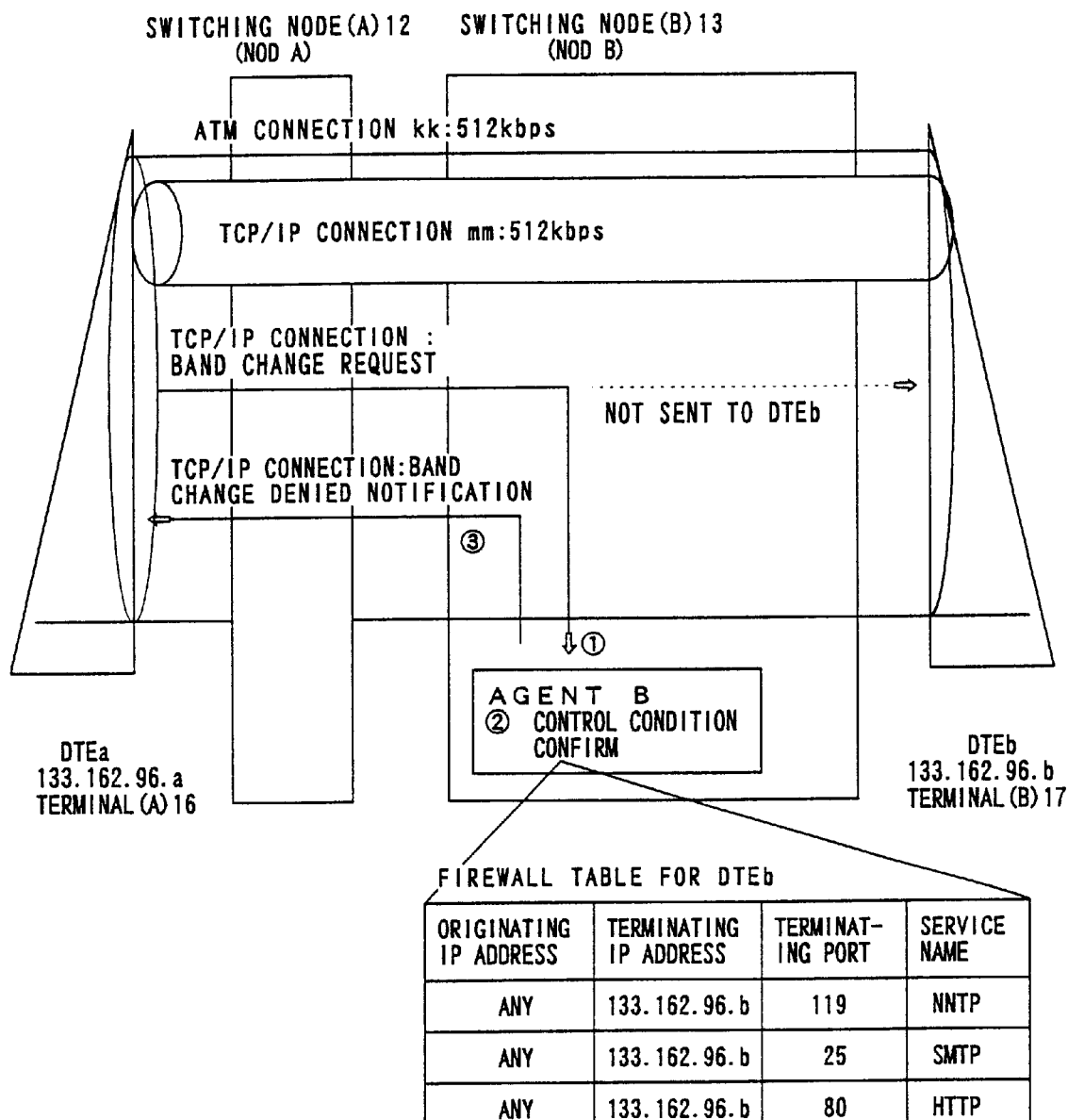
FIG. 19 shows a sequence when the addition of a TCP/IP connection is not granted.

Thus, in the system shown in FIGS. 18 and 19, it is within the ATM network 11 that a determination is made as to whether an TCP/IP connection can be added on the same ATM connection. For this reason, in order to make such a determination, it is not required to use a path between the ATM network 11 and the accessed terminal.

Unlike the conventional system in which, even when the addition of a TCP/IP connection is not granted, traffic is generated between an accessed terminal and the switching node that accommodates that terminal, in the inventive system no traffic is generated.

Figure 20:
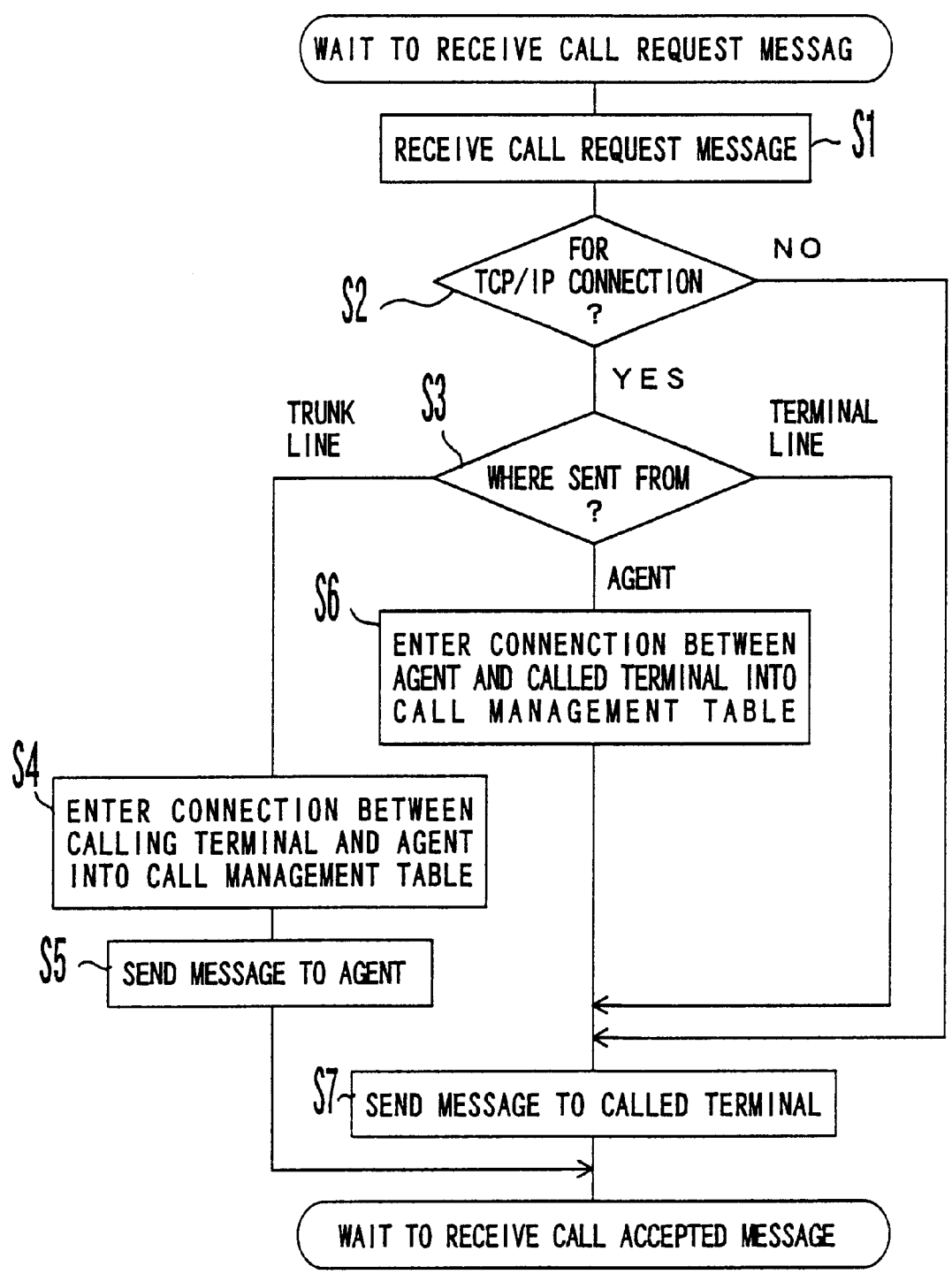
FIGS. 20 and 21 form a flowchart illustrating the operation of the call control section in the switching node at the time of setting up an ATM connection to a calling terminal or a called terminal.

Next, a processing flowchart at each switching node will be described. FIG. 20 is a flowchart for the operation of the call control section in a switching node to establish an ATM connection between a calling terminal and the agent or between the agent and a called terminal. In this example, a firewall is installed in a switching node that accommodates the called terminal (terminating terminal).

In step S1, a call request (connect request) message is received. In step S2, an examination is made as to whether the received call request message is for establishing a TCP/IP connection. If it is, the procedure goes to step S3; otherwise the procedure goes to step S7.

In step S3, an examination is made as to where the call request message was received from. If it was received from a trunk line (line defined by the NNI), then the procedure goes to step S4. If the message was received from the agent, the procedure goes to step S6. If the message was received from a terminal line (line defined by the UNI), the procedure goes to step S7.

Figure 10:
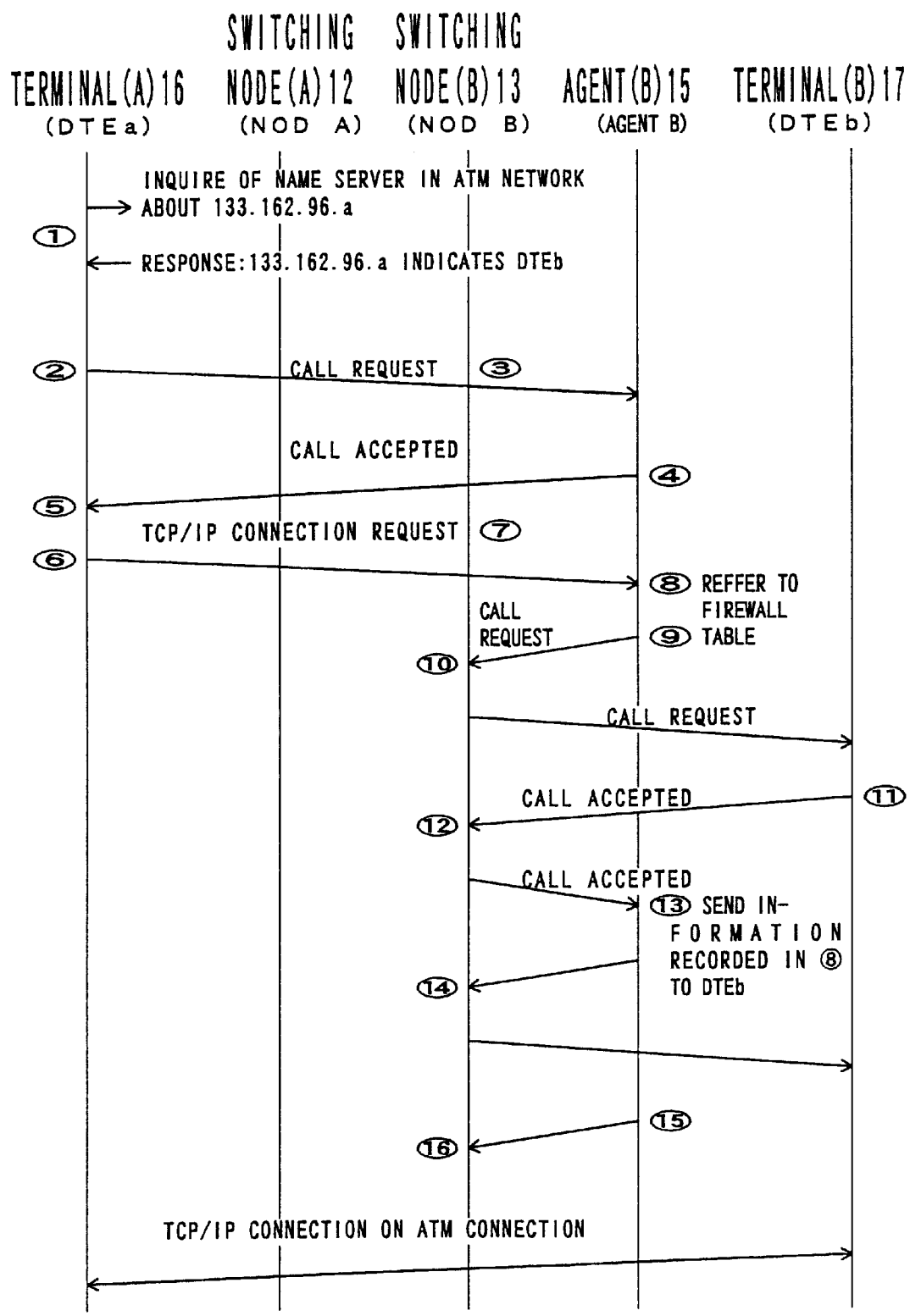
FIG. 10 shows a sequence when access is granted.

The case where the call request message was received from a trunk line corresponds to, for example, steps 2 and 3 in the procedure of FIG. 10. In step S4, an ATM connection between the calling terminal and the agent is entered into the call management table. In step S5, the call request message is passed to the agent. Steps S4 and S5 are carried out in the case where the switching node accommodates the called terminal. If the switching node does not, step S7 is carried out in place of steps S4 and S5.

The case where the call request message was received from the agent corresponds to, for example, steps 9 and 10 in the procedure of FIG. 10. In step 6, an ATM connection between the agent and the called terminal is entered into the call management table. In step 7, the call request message is passed to the called terminal.

Figure 21:
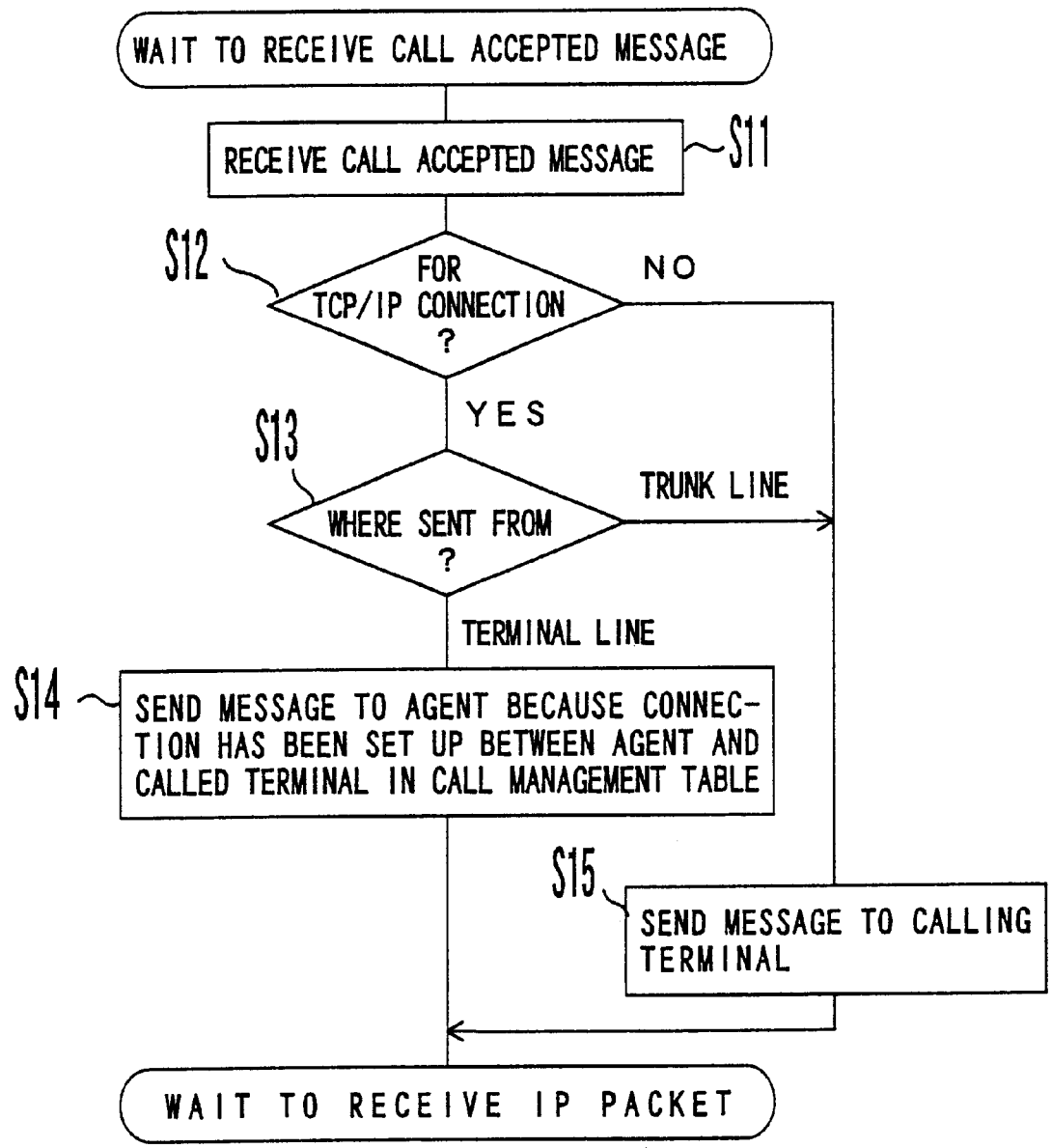

FIG. 21 is a continuation of the flowchart of FIG. 20.

Steps S11, S12 and S13, which handle a call accepted message (call request accepted message), are basically the same as steps S1, S2 and S3 described in connection with FIG. 20. If, in step S13, the determination is that the call accepted message was received from a terminal line, the procedure goes to step S14. If, on the other hand, the message was received from a trunk line, the procedure goes to step S15.

The case where the call accepted message was received from a terminal line corresponds to, for example, steps 11 and 12 in the procedure of FIG. 10. In step S14, the call accepted message is sent to the agent because the call management table indicates that an ATM connection has been set up between the called terminal and the agent.

The case where the call accepted message is received from a trunk line corresponds to, for example, the operation of the switching node (B) 13 in steps 11 and 12 in the procedure of FIG. 15. In step S15, the received call accepted message is sent to the calling terminal.

Figure 22:
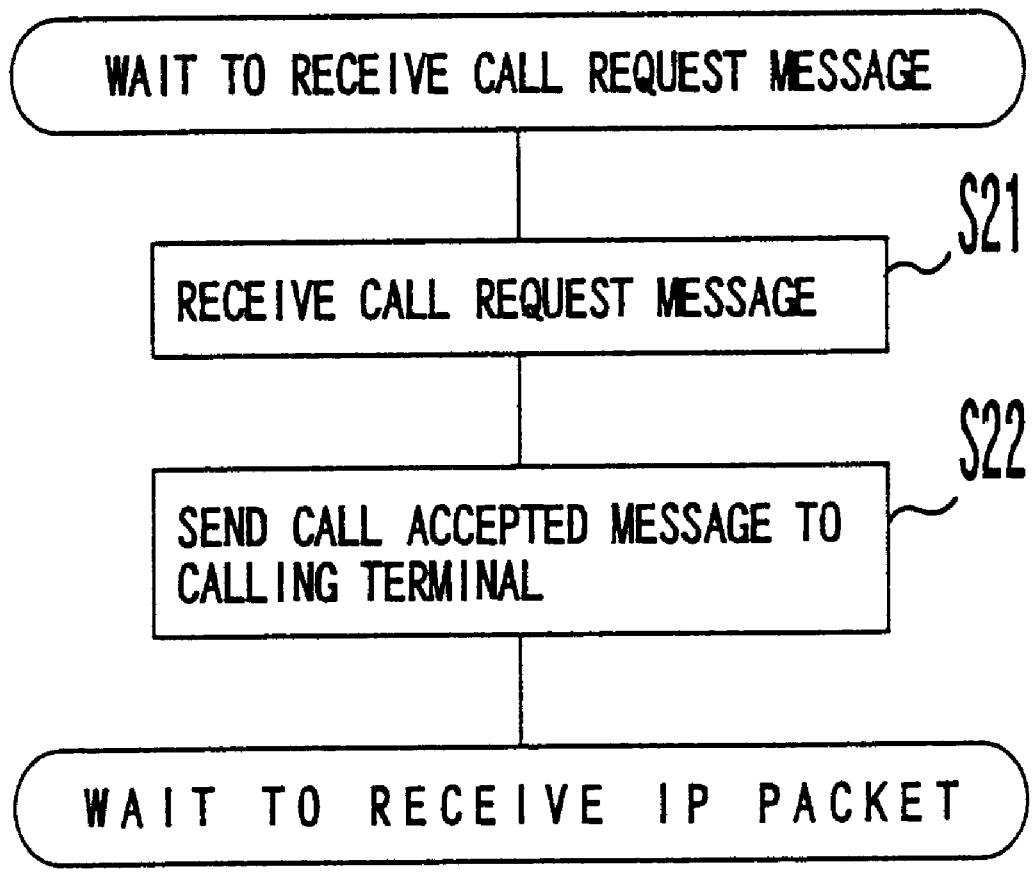
FIG. 22 is a flowchart illustrating the operation of the agent at the time of setting up an ATM connection to a calling terminal.

FIG. 22 is a flowchart illustrating the operation of the agent in establishing an ATM connection between a calling terminal and the agent.

In step S21, a call request message is received. In step S22, a call accepted message received is sent to the calling terminal. This operation corresponds to, for example, step 4 in the procedure of FIG. 10.

Figure 23:
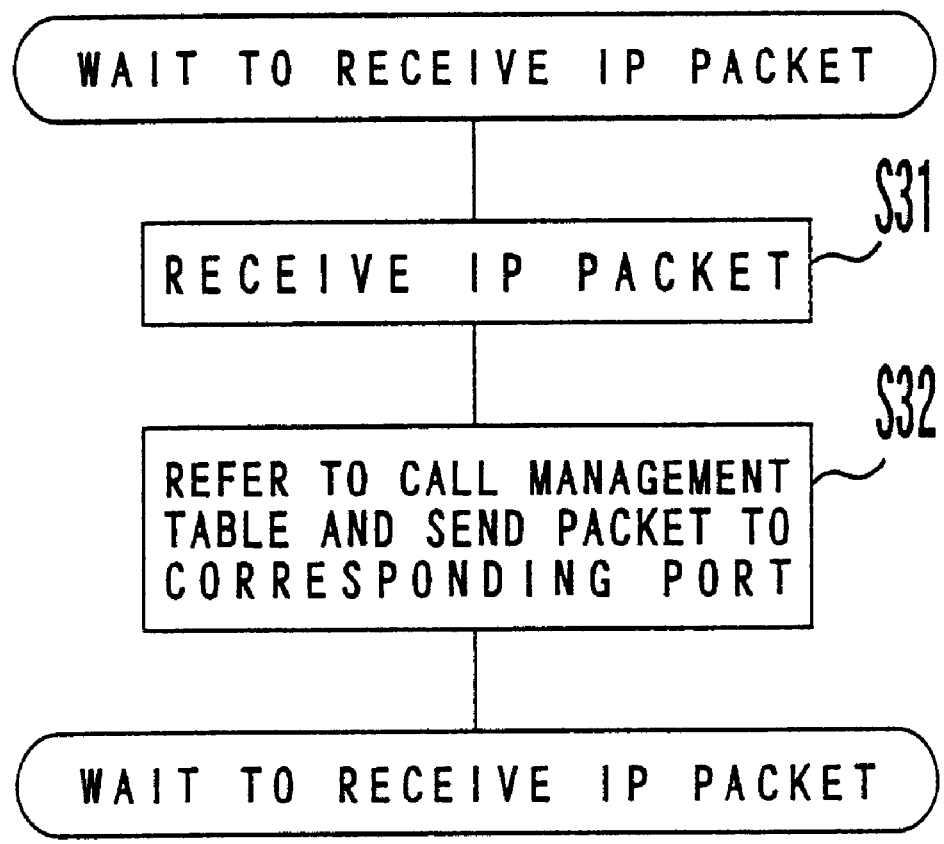
FIG. 23 is a flowchart illustrating the operation of the switching node at the time of receiving an IP packet.

FIG. 23 is a flowchart for the operation of the switching node at the time of receiving an IP packet.

In step S31, an IP packet (TCP/IP packet) is received. This IP packet is carried in ATM cells. In step S32, the received IP packet is sent to a port which is defined in the call management table. The operations in these steps correspond to, for example, step 7 in the procedure of FIG. 10.

FIG. 24 is a flowchart for the operation of the agent in setting up an ATM connection between the agent and a called terminal.

In step S41, an IP packet (TCP/IP packet) is received. In step S42, an examination is made as to whether the received IP packet is a message requesting for an IP connection to be set up. If it is, the procedure goes to step S43; otherwise, the procedure goes to step S53 in which the received IP packet is discarded.

In step S43, an examination is made as to whether a firewall table associated with the called terminal is present. If it is, the procedure goes to step S45. Otherwise, the procedure goes to step S44 in which a request is made to the switching node that accommodates the called terminal for a firewall table associated with it. Step S44 corresponds to, for example, steps a through f in the procedure of FIG. 15.

In step S45, a determination is made as whether to grant the received IP connection setup request or not. If granted (access to the called terminal is not an object of rejection), the procedure goes to step S46; otherwise, the procedure goes to step S51.

In step S46, the call request message is sent to the called terminal. In step S47, a call accepted message is received from the called terminal. In step S48, the IP connection setup request message received in step S41 is sent to the called terminal. In step S49, a request is made to the call control section in the switching node for setting up an ATM connection between the calling terminal and the called terminal with no intervening agent. Steps S46 to S48 correspond, for example, to steps 9 to 14 in the procedure of FIG. 10, and step S49 to step 15 in the same procedure.

In step S50, the call management table is updated as requested in step S49.

In step S51, an ATM connection disconnect request message is sent to the calling terminal. In step S52, an ATM connection disconnect completed message is received from the calling terminal. These steps correspond to, for example, steps 13 and 14 in the procedure of FIG. 13.

FIG. 25 is a flowchart for the operation of the call control section at the time of receiving a band reservation request message. It is supposed here that a firewall is installed in the switching node that accommodates a called terminal (terminating or destination terminal).

In step S61, a band reservation request message is received. In step S62, an examination is made as to whether the received band reservation request message is for a TCP/IP connection. If it is, the procedure goes to step S63; otherwise, the procedure goes to step S65.

In step S63, an examination is made as to where the band reservation request message was sent from. If the message was sent from a trunk line, the procedure goes to step S64. If it was sent from the agent or a terminal line, the procedure goes to step S65.

The case where a band reservation request message is sent from the trunk line corresponds, for example, to step 1 in the procedure of FIG. 18. In step 64, the band reservation request message is passed to the agent. Step 64 is executed when the corresponding switching node accommodates the called terminal; when the switching node does not accommodate it, step 66 is executed in place of step 64.

The case where a band reservation request message is sent from the agent corresponds to step 3 in the procedure of FIG. 18. The case where the message is sent from a terminal line corresponds to the operation of the switching node (A) 12 in step 1 in the procedure of FIG. 18. In step S65, the band is reserved as requested by the band reservation request message. In step S66, the band reservation request message is sent to the called terminal.

Figure 26:
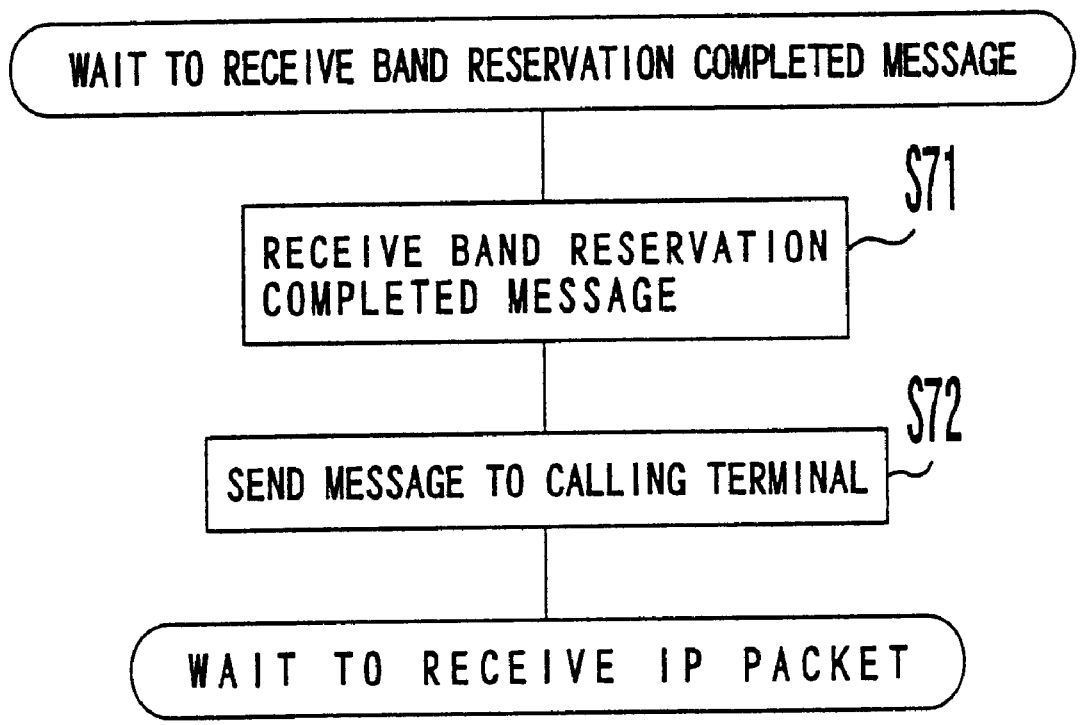
FIG. 26 is a flowchart illustrating the operation of the switching node at the time of receiving a band reservation completed message.

FIG. 26 is a flowchart for the operation of the switching node at the time of receiving of a band reservation completed message.

In step S71, a band reservation completed message is received. In step S72, the received band reservation completed message is sent to the calling terminal. These steps correspond to, for example, step 4 in the procedure of FIG. 18.

Figure 27:
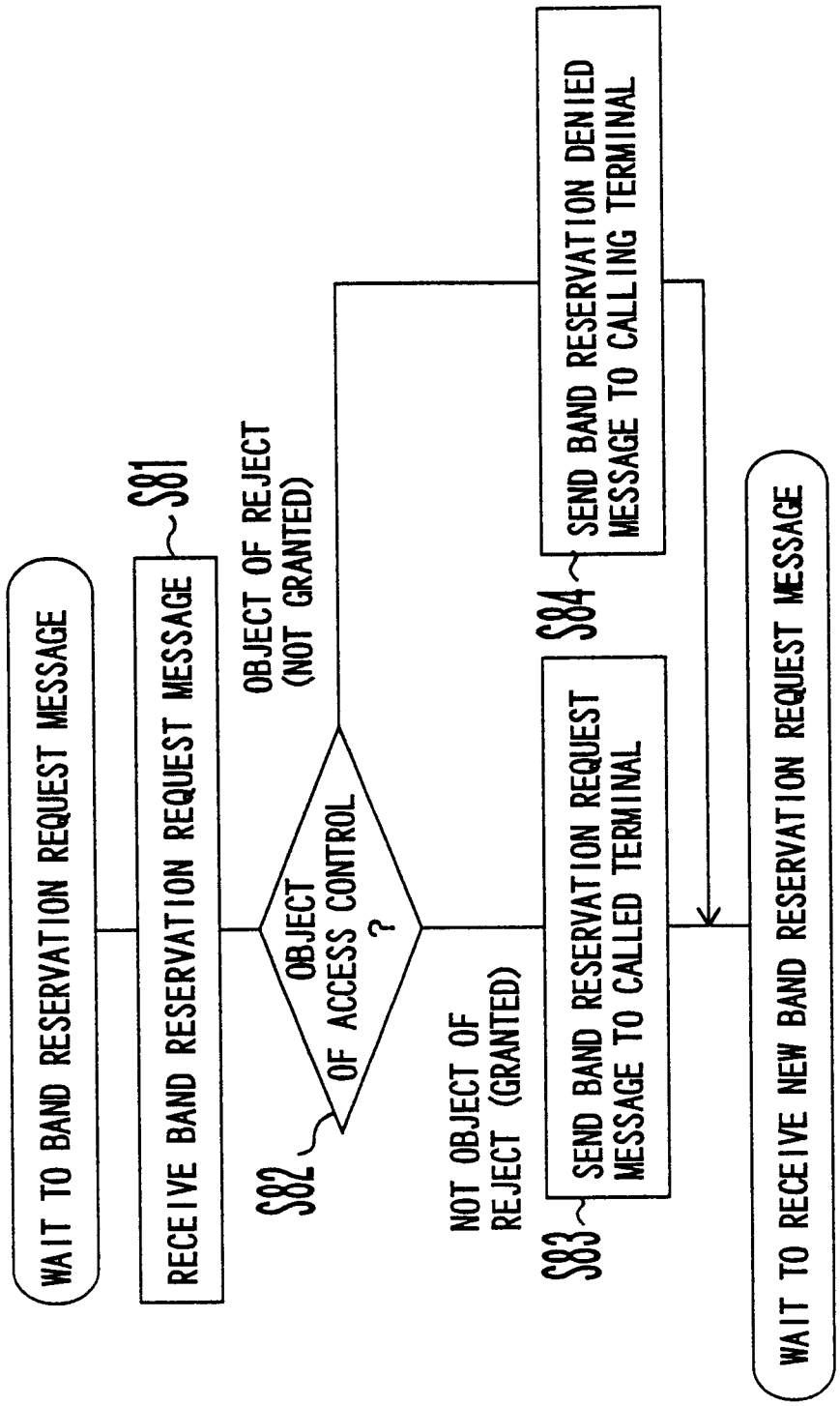
FIG. 27 is a flowchart illustrating the operation of the agent at the time of receiving a band reservation request message.

FIG. 27 is a flowchart for the operation of the agent at the time of receiving a band reservation request message.

In step S81, a band reservation request message is received. In step S82, a determination is made as to whether to grant the received band reservation request or not. If the determination is that the request is granted, the procedure goes to step S83; otherwise, the procedure goes to step S84.

In step S83, the band reservation request message is sent to the called terminal. In step S84, a band reservation denied message is sent to the calling terminal. Step S84 corresponds to, for example, step 3 in the procedure of FIG. 19.

Figure 28:
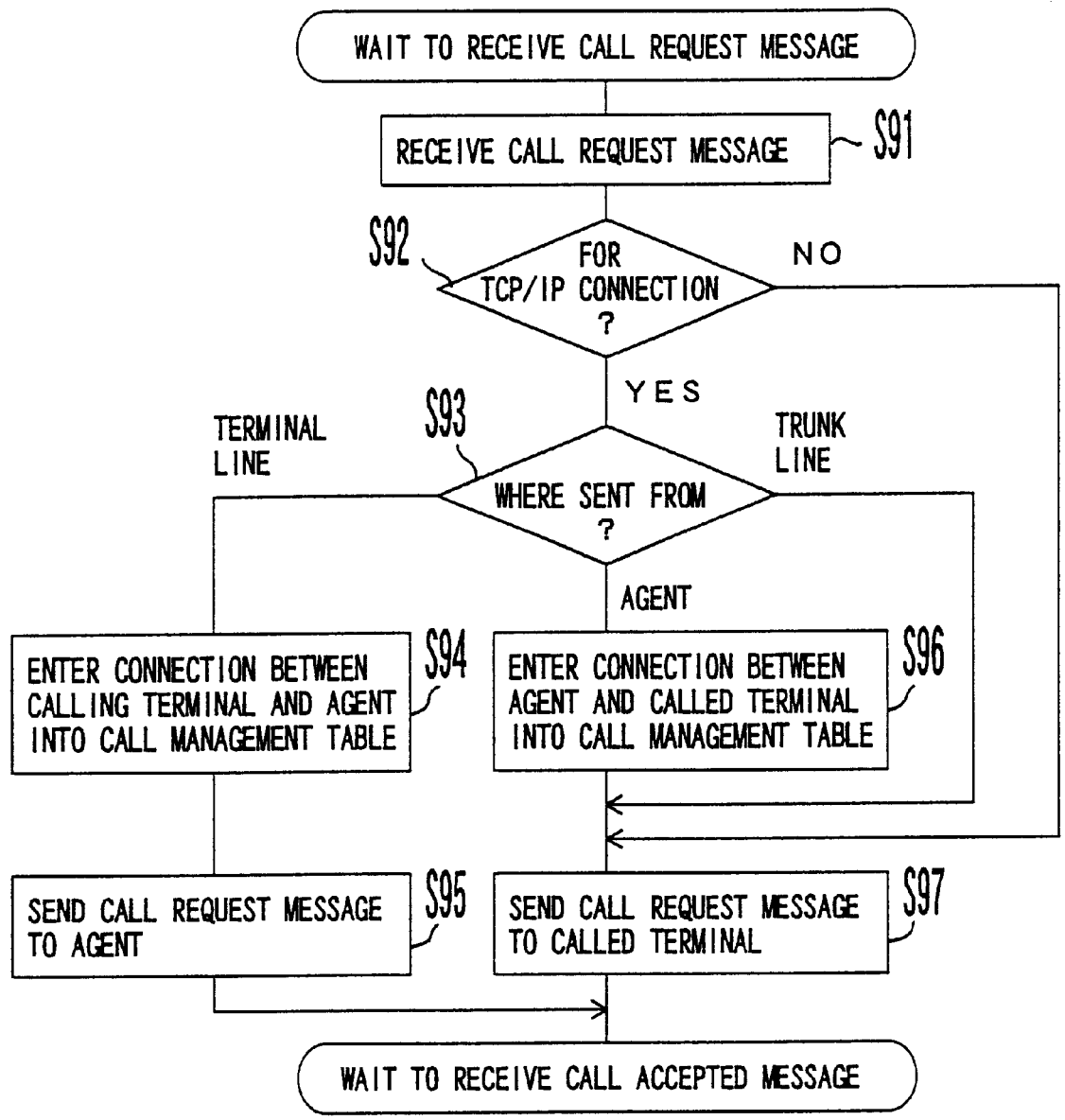
FIGS. 28 and 29 form a flowchart illustrating the operation of the call control section in the switching node at the time of setting up an ATM connection between a calling terminal and the agent or between the agent and a called terminal.

FIG. 28 is a flowchart for the operation of the call control section in the switching node at the time of setting up an ATM connection between a calling terminal and the agent or between the agent and a called terminal. It is supposed here that the firewall is installed in the switching node that accommodates the calling terminal.

In step S91, a call request (connect request) message is received. In step S92, an examination is made as to whether the received call request message is for a TCP/IP connection. If it is, the procedure goes to step S93; otherwise, the procedure goes to step S97.

In step S93, an examination is made as to where the call request message was sent from. If it was sent from a terminal line, the procedure goes to step S94. If it was sent from the agent, the procedure goes to step S96. If it was sent from a trunk line, the procedure goes to step S97.

The case where a call request message is sent from a trunk line corresponds to steps 2 and 3 in the procedure of FIG. 15. In step S94, an ATM connection between the calling terminal and the agent is entered into the call management table. In step S95, the call request message is passed on to the agent.

Figure 29:
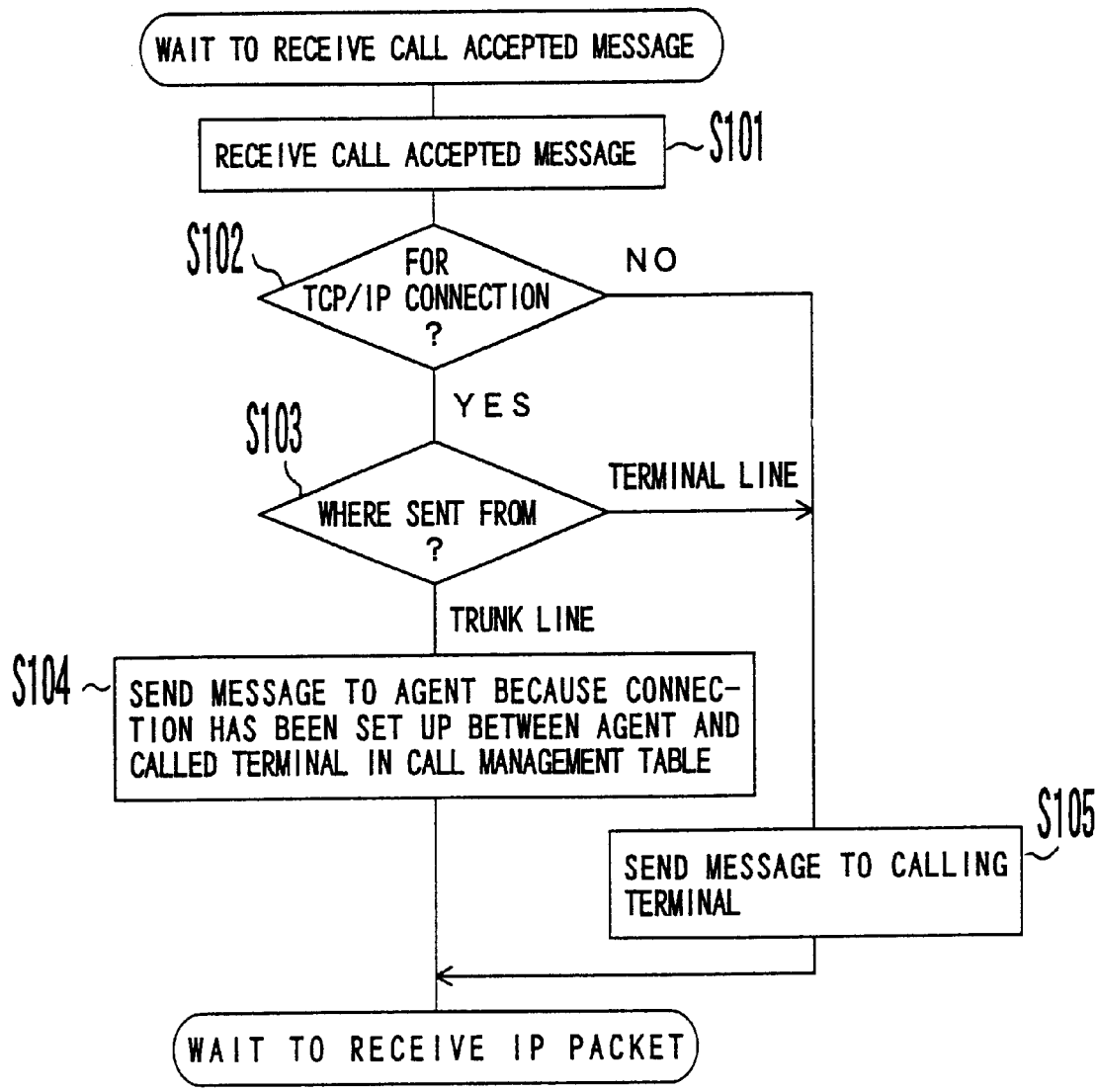

The case where a call request message is sent from the agent corresponds to, for example, steps 9 and 10 in the procedure of FIG. 15. In step S96, an ATM connection between the agent and the called terminal is entered into the call management table. In step S97, the call request message is sent to the called terminal. FIG. 29 is a flowchart for the operation of the call control section in the switching node at the time of setting up an ATM connection between a calling terminal and the agent or between the agent and a called terminal. In this case as well, it is supposed that the firewall is installed in the switching node that accommodates the calling terminal.

Steps 101 to 103, which handle a call accepted message (connect request accepted message), remain basically unchanged from steps S91 to S93 described in connection with FIG. 28. If, in step S103, the determination is that the call accepted message was sent from a trunk line, the procedure goes to step S104. If the message was sent from a terminal line, the procedure goes to step S105.

The case where a call accepted message is sent from a trunk line corresponds to, for example, steps 11 and 12 in the procedure of FIG. 15. In step S104, the call accepted message is sent to the agent because an ATM connection has been set up between the called terminal and the agent in the call management table.

The case where a call accepted message is sent from a terminal line corresponds to, for example, the operation of the switching node (B) 13 in steps 11 and 12 in the procedure of FIG. 15. In step S105, the received call accepted message is sent to the calling terminal.

Although, in the above embodiment, access control conditions are determined by terminating IP addresses and TCP port numbers in the firewall table, originating IP addresses may be set as shown in FIG. 30A. In the example of FIG. 30A, an originating IP address is set for FTP (File Transfer Protocol). In this case, only terminals that have IP addresses entered into the firewall table are allowed to receive an FTP service.

As shown in FIG. 30B, passwords may be entered into the firewall table. In this case, only users who know the passwords are allowed to receive services. That is, user authentication relating to TCP/IP access can be implemented in the ATM network.

Figure 31A:
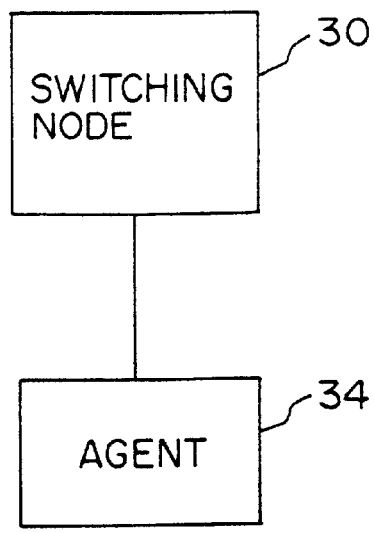
FIGS. 31A and 31B show agent configurations.

Although, in the above embodiment, the agent was described as a virtual terminal installed in a switching node, the agent may be independent of the switching node as shown in FIG. 31A. In this case, the agent 34 is a server computer connected to the switching node 30. The agent and the switching node are linked by a permanent virtual channel (PVC) or switched virtual channel (SVC).

Figure 31B:
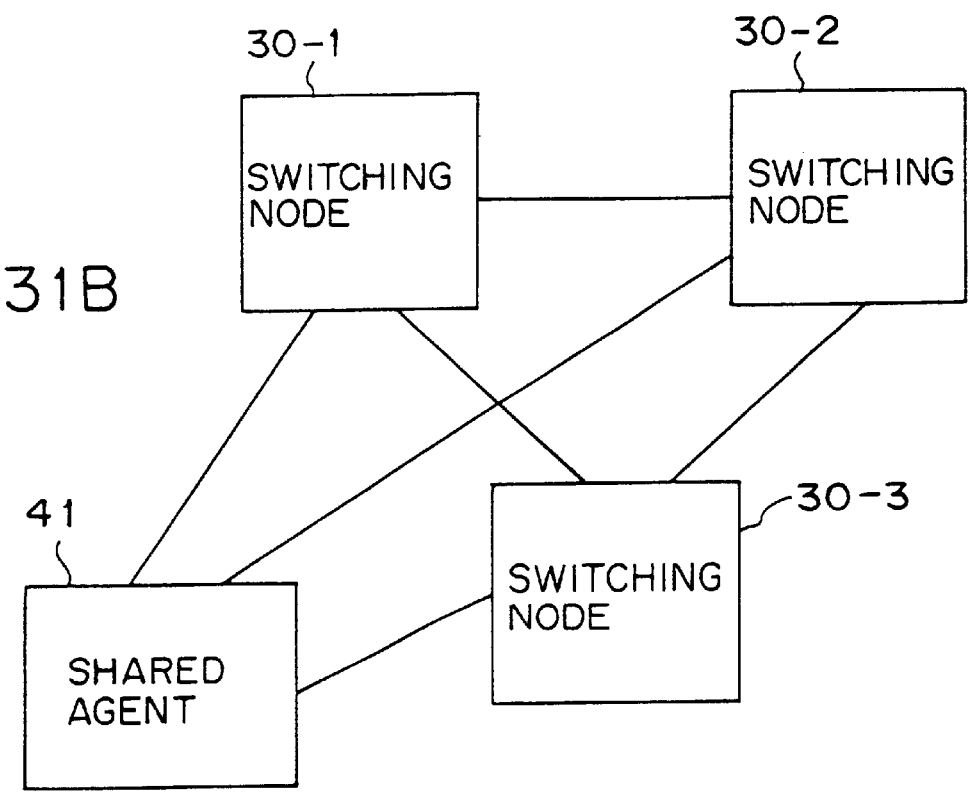

Although, in the above embodiment, each switching node is installed with an agent, a plurality of switching nodes 30-1 to 30-3 may share one agent 41 as shown in FIG. 31B.

The above embodiment, which is an embodiment of the IP over ATM system, is configured such that TCP/IP traffic is sent over an ATM network. The present invention may be applied to other communication protocols than TCP. For example, the present invention is applicable to the user datagram protocol (UDP). In this case, IP addresses and UDP port numbers will be entered into a firewall table, thereby controlling access.

In the world of computer networks, various LANs, such as Ethernet LANs, Token-Ring LANs, Fiber Distributed Data Interface (FDDI) LANs, etc., are currently in wide use. The LAN emulation is a technique of transferring LAN data over an ATM network. The present invention is applicable to a LAN emulation system as well as an IP over ATM system.

Figure 32:
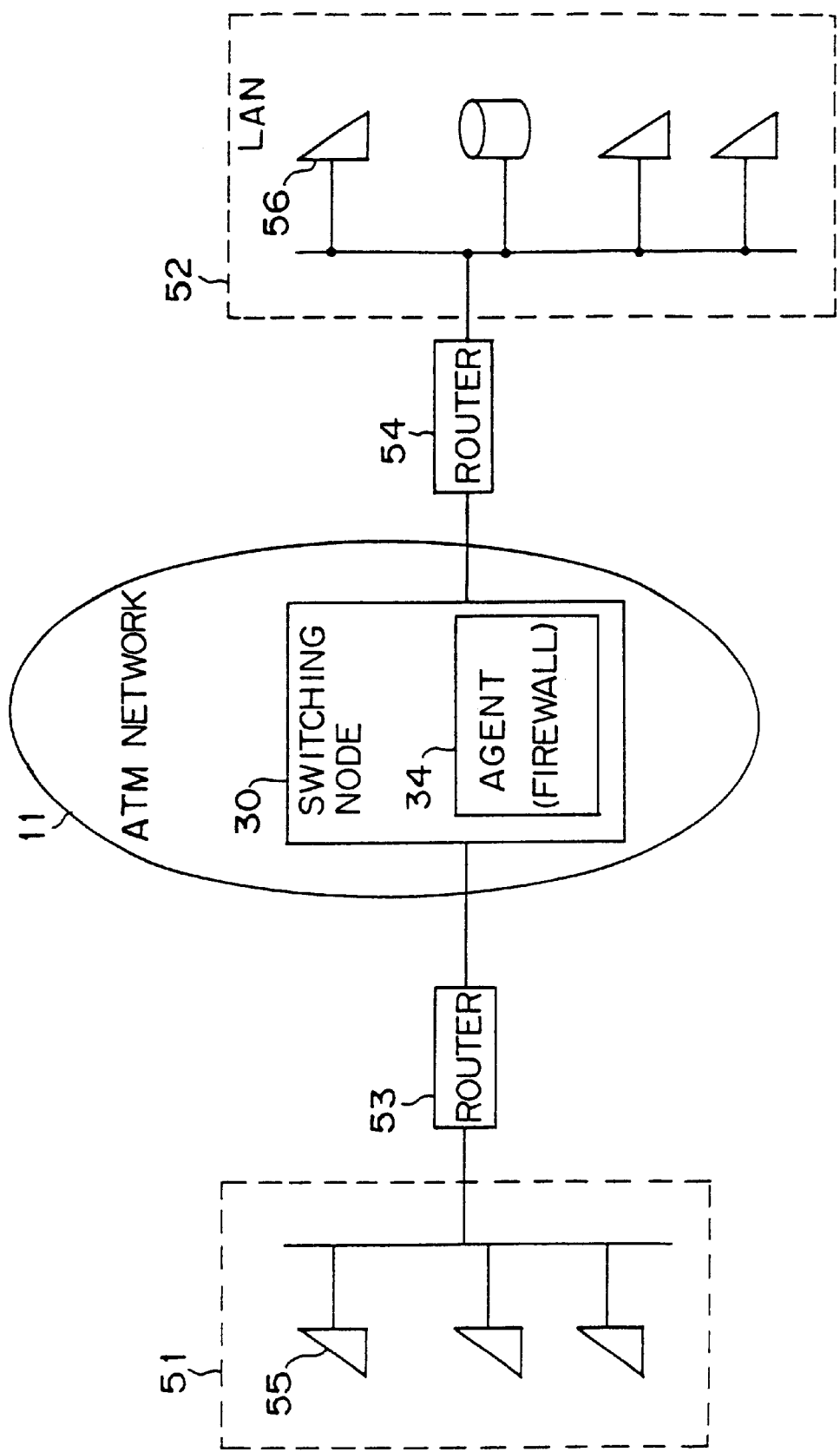
FIG. 32 shows a configuration of a LAN emulation system to which the present invention is applied.

FIG. 32 shows an application of the present invention to a LAN emulation system. In this example, a LAN 51 and a LAN 52 are linked through an ATM network 11.

Typical LAN communication protocols include TCP/IP, IPX/SPX adopted by Net Ware (registered trade mark) developed by Novell Corp., Net BEUI adopted by Windows 95 and Windows NT (both are trade marks) developed by Microsoft Corp., AppleTalk employed by Macintosh (trade mark) designed by Apple Corporation, etc.

Basically the LAN transfers data using MAC (Media Access Control) addresses. With the above-described communication protocols, each protocol has its own addressing system. For instance, IPX/SPX has IPX addresses. When sending data, an IPX frame containing an IPX address (originating and terminating addresses) is encapsulated in a MAC frame. For communication over an ATM network, the frame is sent over the network in the form of ATM cells.

Figures 33A, 33B:
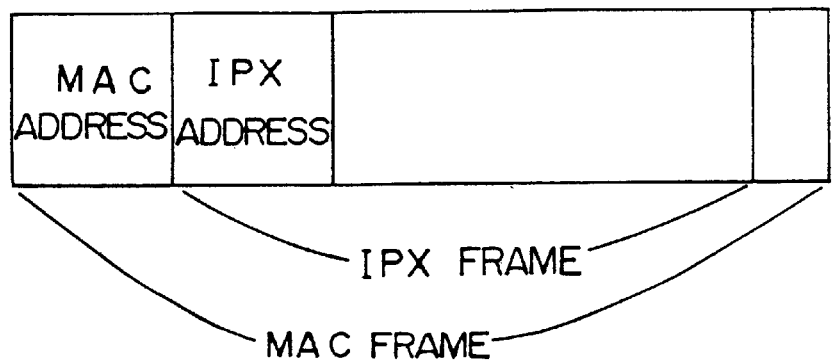
FIG. 33A is a diagram for use in explanation of a frame that conforms to a LAN protocol.
FIG. 33B shows an example of a firewall table in the LAN emulation system.

In a switching node in the ATM network 11 is installed such a firewall table as shown in FIG. 33B. Thus, if an access control condition is set up for each IPX address, a determination can be made as to whether to sent data to the destination terminal or not, i.e., whether to grant access or not, with no need of establishing an ATM connection between the source terminal (access requesting terminal) and the destination terminal (access requested terminal).

As described previously in connection with FIG. 3, for communication between the terminals 16 and 17 directly connected to the ATM network, an ATM connection is established between them when an access request is granted. In contrast, for communication between the LANs 51 and 52, an ATM connection is established between routers 53 and 54 as shown in FIG. 32. For example, when a terminal 55 accommodated in the LAN 51 makes access to a terminal 56 accommodated in the LAN 52, the firewall function installed in the ATM network 11 determines whether to grant the access or not. When the access is granted, an ATM connection is established between the routers 53 and 54. This is true not only of the LAN emulation but also of the IP over ATM.

Basically the LAN provides connectionless communication which transfers data without establishing a connection between sending and receiving terminals. On the other hand, the ATM provides connection-oriented communication in which a connection is established between sending and receiving terminals and then data is transferred over that connection. Therefore, the LAN emulation and the technique of transferring UDP traffic over an ATM network can be said to be a system which transfers connectionless communication traffic over a connection-oriented communication network. In other words, the ATM network is a form of connection-oriented communication network.

The advantages of the present invention are as follows. In an IP over ATM or LAN emulation system, a firewall is installed in an ATM network to determine whether to grant access or not. In order to make such a determination, therefore, there is no need of establishing an ATM connection between a destination terminal and a switching node that accommodates the destination terminal, thus preventing waste of network resources. Since a determination of whether to grant access or not is made without establishing a connection to the destination terminal, no bill will submitted for that determination processing.

What is claimed is:

1. A firewall system, for use with a communications system in which, over a connection-oriented network that exchanges fixed-length packets to conform to a first protocol, communication traffic that conforms to a second protocol is transferred, that controls communications that conform to the second protocol comprising:

a switching node for exchanging fixed-length packets and extracting from received fixed-length packets a fixed-length packet that contains a request made by a first terminal for access to a second terminal, the access request being based on the second protocol; and an agent unit, installed in the network, for judging before establishing a connection based on the first protocol between said switching node and the second terminal whether to grant the request for access to the second terminal or not on the basis of information contained in the fixed-length packet extracted by said switching node, wherein said agent unit establishes a connection based on the first protocol and a connection based on the second protocol between the first terminal or a terminal that accommodates the first terminal and the second terminal or a terminal that accommodates the second terminal, only when the access is granted.

2. The firewall system according to claim 1, wherein, upon receipt of a fixed-length packet containing an access request based on the second protocol, said switching node sends the fixed-length packet to said agent unit.

3. The firewall system according to claim 2, wherein, upon receipt of a fixed-length packet containing an access request based on the second protocol, said agent unit establishes a connection based on the first protocol to the first terminal or a terminal that accommodates the first terminal.

4. The firewall system according to claim 3, wherein, when the access request is granted, said agent unit establishes a connection based on the first protocol to the second terminal or a terminal that accommodates the second terminal.

5. The firewall system according to claim 4, wherein said agent unit changes settings of said switching node in such a way as to change a connection established between the first terminal or a terminal that accommodates the first terminal and said agent and a connection established between the second terminal or a terminal that accommodates the second terminal and said agent to a connection based on the first protocol between the first terminal or the terminal that accommodates the first terminal and the second terminal or the terminal that accommodates the second terminal.

6. The firewall system according to claim 3, wherein, when the access request is not granted, said agent unit notifies the first terminal that the access request is not granted.

7. The firewall system according to claim 1, wherein said agent unit has a firewall table that contains access control conditions based on the second protocol for the second terminal.

8. The firewall system according to claim 7, wherein said agent unit changes the contents of the firewall table according to an indication sent over a connection based on the first protocol.

9. The firewall system according to claim 5, wherein said firewall table is updated according to an instruction from a terminal accommodated in the network.

10. The firewall system according to claim 1, wherein, upon judging that access to the second terminal is not granted, said agent unit rejects the access request without establishing a connection based on the first protocol between said switching node and the second terminal or a terminal that accommodates the second terminal.

11. The firewall system according to claim 1, wherein, when the request for access to the second terminal is issued from the first terminal, said agent unit responds to the first terminal instead of the second terminal.

12. The firewall system according to claim 1, wherein said switching node is a switching device that accommodates the second terminal.

13. The firewall system according to claim 1, wherein said switching node is a switching device that accommodates the first terminal.

14. A firewall system for a communications system using an IP over ATM protocol, which allows a specific device within an ATM network to have a function of judging whether to grant access or not on the basis of at least an IP address of a location to which the access is made, thereby allowing a determination of whether to grant access or not to be made without establishing an ATM connection between the ATM network and the location to which the access is made, and before establishing said connection when access is granted.

15. The firewall system according to claim 14, wherein the determination of whether to grant access or not is made on the basis of the IP address and a TCP port number of the location to which the access is made.

16. A firewall system, for use with a system in which connectionless communications traffic is transferred over a connection-oriented communications network, and for controlling the connectionless communications traffic, which allows a specific device within the connection-oriented communications network to have a function of judging whether to grant access or not on the basis of at least the address of a location to which the access is made, the address being determined by an addressing system defined by a communications protocol for the connectionless communications, thereby allowing a determination of whether to grant access or not to be made without establishing a connection between the network and the location to which the access is made, and before establishing said connection when access is granted.

17. An agent unit, for use with a communications system in which, over a connection-oriented network that exchanges fixed-length packets to conform to a first protocol, communications traffic that conforms to a second protocol is transferred, and for serving as a firewall for controlling the communications that conform to the second protocol comprising:

receiving means for receiving from a switching node a fixed-length packet containing a request made by a first terminal for access to a second terminal based on the second protocol;

judging means for judging before establishing a connection based on the first protocol between said switching node and the second terminal whether to grant the access to the second terminal or not on the basis of information contained in the fixed-length packet received by said receiving means; and connection setup means for, when the access is granted, setting up a connection based on the first protocol and a connection based on the second protocol between the network and the second terminal or a terminal that accommodates the second terminal.

18. A firewall method performed in a communications system in which, over a connection-oriented network that exchanges fixed-length packets that conform to a first protocol, communications traffic that conforms to a second protocol is transferred, for controlling the communications that conform to the second protocol comprising the steps of:

extracting from fixed-length packets received at a switching node a fixed-length packet that contains a request made by a first terminal for access to a second terminal based on the second protocol;

judging before establishing a connection based on the first protocol between said switching node and the second terminal whether to grant the access to the second terminal or not on the basis of information contained in the extracted fixed-length packet; and establishing a connection based on the first protocol and a connection based on the second protocol between the first terminal or a terminal that accommodates the first terminal and the second terminal or a terminal that accommodates the second terminal when the access is granted.

\* \* \* \* \*